United States Patent
Seitz et al.

(10) Patent No.: US 6,524,681 B1
(45) Date of Patent: *Feb. 25, 2003

(54) PATTERNED SURFACE FRICTION MATERIALS, CLUTCH PLATE MEMBERS AND METHODS OF MAKING AND USING SAME

(75) Inventors: David S. Seitz, Woodbury, MN (US); Elizabeth C. Edblom, Minneapolis, MN (US); Karl T. McKeague, Cottage Grove, MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/155,687

(22) PCT Filed: Apr. 8, 1997

(86) PCT No.: PCT/US97/05723

§ 371 (c)(1),
(2), (4) Date: Oct. 2, 1998

(87) PCT Pub. No.: WO97/38236

PCT Pub. Date: Oct. 16, 1997

(51) Int. Cl.[7] .......................... D06N 7/04; F16D 11/00; B60K 17/00; B61D 17/00; B61K 1/00
(52) U.S. Cl. ................ 428/143; 428/147; 428/172; 192/107 M; 188/251 R; 188/257; 180/337; 105/1.4; 104/2; 104/18; 74/340
(58) Field of Search ................ 428/174, 141, 428/172, 156, 143, 147, 323; 192/107 R, 108, 107 M; 188/257, 251 M, 251 R; 74/339, 340; 180/337; 104/2, 18, 118; 105/457, 1.4; 51/295, 307

(56) References Cited

U.S. PATENT DOCUMENTS

| 1,898,978 A | 2/1933 | Lane |
| 1,941,962 A | 1/1934 | Tone .......................... 91/67.9 |
| 1,988,065 A | 1/1935 | Wooddell ....................... 91/68 |

(List continued on next page.)

FOREIGN PATENT DOCUMENTS

| CA | 2009718 | 9/1990 | ............. C08F/2/46 |
| DE | 2757801 | 6/1979 | ........... F16D/13/64 |
| DE | 3417813 | 6/1985 | ........... F16D/69/02 |
| DE | 3619894 A1 | 1/1987 | ........... F16D/13/64 |
| DE | 4019792 A1 | 7/1991 | ........... F16D/69/00 |
| EP | 0 004 454 A3 | 10/1979 | ........... B24D/11/00 |

(List continued on next page.)

OTHER PUBLICATIONS

Miura et al., "Study on the Dynamic Property of a Paper–Based Wet Clutch", Society of Automotive Engineers, Inc., pp. 281–287 (1998).
"Dextron–III Automatic Transmission Fluid Specification", GM–6297M, *GM Powertrain*, Appendix C & D (Apr. 1993).
"Irgacure® 369" Brochure of Ciba–Geigy Corp., 1993.
*Encyclopedia of Polymer Science and Technology*, vol. 8, John Wiley, New York, pp. 661–665 (1968).

(List continued on next page.)

Primary Examiner—Donald J. Loney
(74) Attorney, Agent, or Firm—Harold C. Knecht, III

(57) ABSTRACT

A friction material for a friction facing member useful for transmitting torque includes a backing having a front surface and a rear surface. A plurality of precisely shaped friction composites defining patterned friction coating are attached to the front surface of the backing. The precisely shaped friction composites include a plurality of friction particles dispersed in a binder. In one embodiment, the friction material has an elastic modulus of about $10^7$ dynes/cm$^2$ or less.

35 Claims, 3 Drawing Sheets

U.S. PATENT DOCUMENTS

| | | | |
|---|---|---|---|
| 2,001,911 A | 5/1935 | Wooddell et al. ............ 51/190 |
| 2,015,658 A | 10/1935 | Bezzenberger ............... 51/278 |
| 2,108,645 A | 2/1938 | Bryant ............................. 91/68 |
| 2,115,897 A | 5/1938 | Wooddell et al. ............ 51/188 |
| 2,135,126 A | 11/1938 | Harwood .................... 192/107 |
| 2,252,683 A | 8/1941 | Albertson .................... 51/293 |
| 2,394,783 A | 2/1946 | Keller et al. .................. 260/41 |
| 2,620,320 A | 12/1952 | Novak et al. .............. 260/23.7 |
| 2,755,607 A | 7/1956 | Haywood .................... 51/185 |
| 2,806,772 A | 9/1957 | Robie ........................... 51/296 |
| 2,876,086 A | 3/1959 | Raymond .................... 51/298 |
| 2,907,146 A | 10/1959 | Dyar ............................ 51/195 |
| 2,954,853 A * | 10/1960 | Maierson et al. ...... 188/251 M |
| 3,016,119 A | 1/1962 | Rosenberger et al. ......... 192/68 |
| 3,048,482 A | 8/1962 | Hurst ........................... 51/298 |
| 3,057,256 A | 10/1962 | Erban ........................ 88/28.93 |
| 3,191,734 A | 6/1965 | Batchelor et al. ............. 192/68 |
| 3,211,634 A | 10/1965 | Lorenzo ....................... 204/16 |
| 3,455,868 A | 7/1969 | D'Alessandro .............. 260/38 |
| 3,476,228 A | 11/1969 | Pritchard .................... 192/107 |
| 3,517,466 A | 6/1970 | Bouvier ....................... 51/358 |
| 3,520,390 A | 7/1970 | Bentz ......................... 192/107 |
| 3,549,341 A | 12/1970 | Kittredge et al. ............. 51/293 |
| 3,594,865 A | 7/1971 | Erb .................................. 18/5 |
| 3,605,349 A | 9/1971 | Anthon ........................ 51/402 |
| 3,615,302 A | 10/1971 | Rowse et al. ................. 51/295 |
| 3,631,638 A | 1/1972 | Yoshikawa et al. ........... 51/295 |
| 3,641,719 A | 2/1972 | Yang ........................... 51/402 |
| 3,652,510 A | 3/1972 | Blomberg ................. 260/78 A |
| 3,654,692 A | 4/1972 | Goetz ........................... 29/558 |
| 3,655,609 A | 4/1972 | Evans et al. .................. 260/38 |
| 3,661,544 A | 5/1972 | Whitaker ...................... 51/295 |
| 3,673,276 A | 6/1972 | Keller et al. .................. 260/38 |
| 3,689,346 A | 9/1972 | Rowland ..................... 186/245 |
| 3,699,085 A | 10/1972 | Johnson .................... 260/78 A |
| 3,717,230 A | 2/1973 | Hartmann ............... 192/107 R |
| 3,738,901 A | 6/1973 | Matsushima et al. ......... 161/42 |
| 3,833,703 A | 9/1974 | Joos ............................ 264/167 |
| 3,841,949 A | 10/1974 | Black ........................... 161/42 |
| 3,859,407 A | 1/1975 | Blanding et al. ............. 264/62 |
| 3,870,581 A | 3/1975 | Afflerbach et al. ......... 156/192 |
| 3,899,050 A | 8/1975 | Savary et al. .............. 188/73.1 |
| 3,904,000 A | 9/1975 | Berger .................. 188/218 XL |
| 3,991,527 A | 11/1976 | Maran ......................... 51/397 |
| 4,011,358 A | 3/1977 | Roelofs ....................... 428/287 |
| 4,038,047 A | 7/1977 | Haywood .................... 51/295 |
| 4,055,029 A | 10/1977 | Kalbow ....................... 51/395 |
| 4,106,915 A | 8/1978 | Kagawa et al. ............... 51/296 |
| RE29,808 E | 10/1978 | Wagner ....................... 51/401 |
| 4,197,352 A | 4/1980 | Emmett et al. .............. 428/409 |
| 4,260,047 A | 4/1981 | Nels ......................... 192/70.14 |
| 4,270,640 A | 6/1981 | Davies ..................... 192/70.14 |
| 4,280,609 A | 7/1981 | Cruise ..................... 192/113 B |
| 4,305,494 A | 12/1981 | Ishida et al. ........... 192/107 M |
| 4,311,489 A | 1/1982 | Kressner ...................... 51/298 |
| 4,314,827 A | 2/1982 | Leitheiser et al. ............ 51/293 |
| 4,318,766 A | 3/1982 | Smith ......................... 156/330 |
| 4,364,746 A | 12/1982 | Bitzer et al. .................. 51/298 |
| 4,374,211 A | 2/1983 | Gallagher et al. .......... 523/156 |
| 4,396,100 A | 8/1983 | Eltze ...................... 192/70.12 |
| 4,420,527 A | 12/1983 | Conley ....................... 428/172 |
| 4,422,538 A | 12/1983 | Krumm .................. 192/70.14 |
| 4,456,500 A | 6/1984 | Ibeta ......................... 156/634 |
| 4,501,347 A | 2/1985 | Cerny et al. ............ 188/250 G |
| 4,516,443 A | 5/1985 | Hamano et al. ............... 74/711 |
| 4,529,079 A | 7/1985 | Albertson .............. 192/107 C |
| 4,539,017 A | 9/1985 | Augustin ..................... 51/293 |
| 4,553,982 A | 11/1985 | Korbel et al. ................. 51/298 |
| 4,576,850 A | 3/1986 | Martens ..................... 428/156 |
| 4,587,291 A | 5/1986 | Gardziella et al. .......... 524/595 |
| 4,588,258 A | 5/1986 | Hoopman ................... 350/103 |
| 4,588,419 A | 5/1986 | Caul et al. .................... 51/295 |
| 4,623,364 A | 11/1986 | Cottringer et al. ............ 51/309 |
| 4,632,236 A | 12/1986 | Koitabashi ................ 192/84 C |
| 4,639,392 A | 1/1987 | Nels et al. ................... 428/283 |
| 4,652,274 A | 3/1987 | Boettcher et al. ............. 51/298 |
| 4,652,275 A | 3/1987 | Bloecher et al. .............. 51/298 |
| 4,674,616 A | 6/1987 | Mannino, Jr. ........... 192/107 R |
| 4,735,632 A | 4/1988 | Oxman et al. ................ 51/295 |
| 4,744,802 A | 5/1988 | Schwabel ..................... 51/309 |
| 4,751,138 A | 6/1988 | Tumey et al. ................ 428/323 |
| 4,770,671 A | 9/1988 | Monroe et al. ............... 51/293 |
| 4,773,920 A | 9/1988 | Chasman et al. .............. 51/295 |
| 4,799,939 A | 1/1989 | Bloecher et al. .............. 51/293 |
| 4,875,259 A | 10/1989 | Appeldorn .................... 24/576 |
| 4,881,951 A | 11/1989 | Wood et al. .................. 51/309 |
| 4,903,440 A | 2/1990 | Larson et al. ................. 51/298 |
| 4,917,743 A | 4/1990 | Gramberger et al. ......... 156/89 |
| 4,930,266 A | 6/1990 | Calhoun et al. .............. 51/293 |
| 4,950,696 A | 8/1990 | Palazotto et al. ............. 522/25 |
| 4,952,612 A | 8/1990 | Brown-Wensley et al. ... 522/25 |
| 4,983,458 A | 1/1991 | Dejaiffe .................... 428/402 |
| 4,985,340 A | 1/1991 | Palazzotto et al. ........... 430/270 |
| 4,986,496 A | 1/1991 | Marentic et al. ............ 244/130 |
| 4,995,500 A | 2/1991 | Payvar ................... 192/107 R |
| 4,997,461 A | 3/1991 | Markhoff-Matheny et al. ............... 51/295 |
| 5,004,089 A | 4/1991 | Hara et al. ............. 192/107 M |
| 5,011,508 A | 4/1991 | Wald et al. ................... 51/293 |
| 5,011,513 A | 4/1991 | Zador et al. .................. 51/295 |
| 5,014,468 A | 5/1991 | Ravipati et al. ............... 51/295 |
| 5,015,266 A | 5/1991 | Yamamoto ................... 51/293 |
| 5,022,895 A | 6/1991 | Wiand .......................... 51/295 |
| 5,039,311 A | 8/1991 | Bloecher ...................... 51/295 |
| 5,055,113 A | 10/1991 | Larson et al. ................. 51/298 |
| 5,061,294 A | 10/1991 | Harmer et al. ................ 51/295 |
| 5,069,403 A | 12/1991 | Marentic et al. ............ 244/130 |
| 5,078,753 A | 1/1992 | Broberg et al. ............... 51/298 |
| 5,083,650 A | 1/1992 | Seiz et al. ............. 192/107 M |
| 5,086,086 A | 2/1992 | Brown-Wensley et al. ... 522/25 |
| 5,089,536 A | 2/1992 | Palazzotto ................... 522/16 |
| 5,090,968 A | 2/1992 | Pellow ......................... 51/293 |
| 5,093,180 A | 3/1992 | Morgan ...................... 428/156 |
| 5,101,953 A | 4/1992 | Payvar ................... 192/107 R |
| 5,107,626 A | 4/1992 | Mucci ....................... 51/281 R |
| 5,131,926 A | 7/1992 | Rostoker et al. .............. 51/309 |
| 5,133,516 A | 7/1992 | Marentic et al. ............ 244/130 |
| 5,147,900 A | 9/1992 | Palazzotto et al. ............. 522/25 |
| 5,152,917 A | 10/1992 | Pieper et al. .................. 51/295 |
| 5,174,795 A | 12/1992 | Wiand .......................... 51/295 |
| 5,178,646 A | 1/1993 | Barber, Jr. et al. ............ 51/298 |
| 5,184,704 A * | 2/1993 | Hays ..................... 192/107 M |
| 5,191,101 A | 3/1993 | Palazzotto et al. ........... 556/47 |
| 5,199,227 A | 4/1993 | Ohishi ......................... 51/395 |
| 5,201,916 A | 4/1993 | Berg et al. .................... 51/293 |
| 5,203,884 A | 4/1993 | Buchanan et al. ............. 51/295 |
| 5,219,462 A | 6/1993 | Bruxvoort et al. ............ 51/293 |
| 5,234,740 A | 8/1993 | Reeves et al. ................ 428/167 |
| 5,236,472 A | 8/1993 | Kirk et al. .................... 51/298 |
| 5,273,805 A | 12/1993 | Calhoun et al. ............. 428/156 |
| 5,304,223 A | 4/1994 | Pieper et al. .................. 51/293 |
| 5,316,812 A | 5/1994 | Stout et al. .................... 428/64 |
| 5,318,604 A | 6/1994 | Gorsuch et al. .............. 51/293 |
| 5,332,075 A | 7/1994 | Quigley et al. ......... 192/107 R |
| 5,361,480 A | 11/1994 | Gardner et al. ............... 29/467 |
| 5,368,619 A | 11/1994 | Culler ........................... 51/308 |
| 5,378,251 A | 1/1995 | Culler et al. .................. 51/295 |
| 5,435,816 A | 7/1995 | Spurgeon et al. ............. 51/295 |
| 5,436,063 A | 7/1995 | Follett et al. ................ 428/224 |
| 5,437,754 A | 8/1995 | Calhoun ..................... 156/231 |
| 5,453,312 A | 9/1995 | Haas et al. .................. 428/143 |

| | | | | |
|---|---|---|---|---|
| 5,454,844 A | 10/1995 | Hibbard et al. .............. 51/295 |
| 5,460,255 A | 10/1995 | Quigley ............... 192/113.36 |
| 5,489,235 A | 2/1996 | Gagliardi et al. ........... 451/527 |
| 5,523,152 A | 6/1996 | Thurber et al. ............. 428/323 |
| 5,526,914 A | 6/1996 | Dwivedi et al. ....... 192/107 M |
| 5,527,368 A | 6/1996 | Supkis et al. ................ 51/298 |
| 5,553,371 A | 9/1996 | Uchino et al. ............. 29/527.2 |
| 5,558,317 A | 9/1996 | Nels .......................... 267/156 |
| 5,571,372 A | 11/1996 | Miyaishi et al. ............ 156/515 |
| 5,580,647 A | 12/1996 | Larson et al. .............. 428/245 |
| 5,582,672 A | 12/1996 | Follett et al. ............... 156/279 |
| 5,585,166 A | 12/1996 | Kearsey ...................... 428/212 |
| 5,595,578 A | 1/1997 | Stubbs et al. ................ 51/295 |
| 5,611,825 A | 3/1997 | Engen et al. ................ 51/295 |
| 5,681,612 A | 10/1997 | Benedict et al. ............ 427/240 |
| 5,709,948 A | 1/1998 | Perez et al. ................. 428/413 |
| 5,712,029 A | 1/1998 | Tsugawa et al. ............ 428/323 |

FOREIGN PATENT DOCUMENTS

| | | | | |
|---|---|---|---|---|
| EP | 0 109 581 A2 | 5/1984 | .......... G06F/15/20 |
| EP | 0 168 065 A1 | 1/1986 | .......... C08L/61/10 |
| EP | 0 306 161 A2 | 3/1989 | ............ C08F/4/44 |
| EP | 0 306 162 A2 | 3/1989 | ............ C08F/4/44 |
| EP | 0 345 239 A1 | 12/1989 | .......... B24D/7/10 |
| EP | 0 429 269 A1 | 5/1991 | ............. C09J/7/02 |
| EP | 0 554 668 A1 | 8/1993 | .......... B24D/11/00 |
| EP | 0 650 803 A1 | 5/1995 | .......... B24B/7/24 |
| EP | 0 650 807 A1 | 5/1995 | .......... B24D/3/28 |
| EP | 0 762 009 A1 | 3/1997 | .......... F16D/69/02 |
| EP | 0 801 247 A2 | 10/1997 | .......... F16D/69/00 |
| EP | 0 806 586 A2 | 11/1997 | .......... F16D/69/04 |
| FR | 881 239 | 4/1943 | |
| FR | 2 354 373 | 1/1978 | ............ C09C/1/68 |
| GB | 757954 | 9/1953 | |
| GB | 757954 | 9/1963 | |
| GB | 1005448 | 9/1965 | |
| GB | 2 043 501 A | 10/1980 | .......... B24D/11/00 |
| GB | 2 094 824 A | 9/1982 | .......... B24D/11/04 |
| GB | 2 260 168 a | 4/1993 | .......... F16D/69/04 |
| JP | 57-121458 | 7/1982 | .......... B24B/21/16 |
| JP | 58-196974 | 11/1983 | .......... B24D/11/02 |
| JP | 60-9663 | 1/1985 | .......... B24D/11/00 |
| JP | 61-244468 | 10/1986 | .......... B24D/11/00 |
| JP | 62-255069 | 11/1987 | .......... B24D/11/00 |
| JP | 63-77944 | 4/1988 | .............. C08J/5/14 |
| JP | 2-83172 | 3/1990 | .......... B24D/11/00 |
| JP | 4-159084 | 6/1992 | .......... B24D/1/00 |
| JP | 6-190737 | 7/1994 | .......... B24D/13/14 |
| RU | 749650 | 7/1980 | .......... B24D/11/00 |
| RU | 872851 | 10/1981 | .......... F16D/13/64 |
| RU | 975375 | 11/1982 | .......... B24D/11/00 |
| RU | 996178 | 2/1983 | ............ B24D/3/22 |
| RU | 1316805 A1 | 6/1987 | .......... B24D/11/00 |
| SU | 872851 | 10/1981 | .......... F16D/13/64 |
| WO | WO 95/01241 | 1/1995 | .......... B24D/3/28 |
| WO | WO 95/07797 | 3/1995 | .......... B24D/11/00 |
| WO | WO 96/10701 | 4/1996 | .......... F16D/13/72 |
| WO | WO 97/38236 | 10/1997 | .......... F16D/69/02 |

OTHER PUBLICATIONS

J.V. Crivello, "Photoinitiated Cationic Polymerization", *Ann. Rev. Mater. Sci.*, 13, 173–190 (1983).

Wilke et al., "Coated Abrasive Superfinishing: Predictable, Repeatable Texturing of Metal Roll Surfaces", from 3M Industrial Abrasives Division, Doc. No. A–ARLSF(92.05)BPH, May 1992 (8 pages).

"Gem Centerless Microfinishers", Brochure of Grinding Equipment & Machinery Co., Inc., Youngstown, OH (published before Jan. 1, 1990).

"Superfinishing: The Microfinishing Systems Way", Brochure of 3M Microfinishing Systems, 6 pages (Jul. 14, 1988).

Kirk–Othmer *Encyclopedia of Chemical Technology*, Third Edition, vol. 1, John Wiley, New York, pp. 35–37 (1978).

V.A. Morozov, "How the Surface Relief of Abrasive Belts Affects Efficiency in Grinding Jobs", *Soviet Engineering Research*, 9, 103–107 (1989).

Miura et al., "Study on the Dynamic Property of a Paper–Based Wet Clutch", Society of Automotive Engineers, Inc., pp. 281–287 (1998).

\* cited by examiner

PATTERNED SURFACE FRICTION MATERIALS, CLUTCH PLATE MEMBERS AND METHODS OF MAKING AND USING SAME

This invention pertains to patterned surface friction materials for use in clutch plate members, brake pads, transmissions and the like, and methods of making and using these constructions.

Friction materials are used in a wide variety of different automotive applications such as for brake linings, brake pads, for torque converter clutches in automatic transmissions, synchronizer rings in manual transmissions, and in so-called "slipping" clutches in newer automobiles (a variation of a torque converter clutch).

In general, friction materials need to meet requirements in a wide variety of properties. Desired attributes of a friction material include toughness, strength, heat resistance, good frictional properties, and long life. Friction materials for transmissions should have a generally level torque curve, display no bond failure under standard usage conditions, and have retention of torque curve levelness and torque capacity. In addition, as smooth operation of the clutch is enhanced by friction modifiers in the transmission fluid, the friction material should hold or retain an appropriate amount of fluid at the engaging surface. Towards these and other objectives, patterned or textured friction surfaces for a friction material have been proposed heretofore.

One method to make such a patterned surface for a friction material is by a batch thermocompression molding process, such as disclosed in U.S. Pat. No. 5,004,089 (Hara et al.), wherein the mold has essentially the inverse shape of the desired dimpled surface. Since the molding processes are generally batch processes that require considerable time and energy, they are disfavored for large scale production facilities. U.S. Pat. No. 3,841,949 (Black) describes a composite friction plate provided with a facing of synthetic rubber presenting small islands in which friction material, such as sintered powdered bronze particles, is embedded to form the actual friction surface. Preferably, such particles or lands are said to be in the shape of circular buttons, which project from a thin base of an outer coating, such as heat resistant synthetic rubber, and are distributed over the base in spaced relation to each other. This arrangement is said to reduce the requirements for the quantity of cooling oil needed for the dissipation of a given amount of heat in the clutch or brake.

Abrasive articles are known having a contoured topography abrasive layer characterized as being a three-dimensionally shaped, radiation-cured dispersion of abrasive particles in an organic binder, such as described in U.S. Pat. No. 5,152,917 (Pieper et al.). This patent in general describes abrasive materials made by coating a slurry of UV curable resin and abrasive particles onto a patterned surface, contacting the slurry-coated patterned surface with a backing, curing the resin, and removing the finished abrasive article from the patterned surface. However, the abrasive materials as described therein are inadequate for use as friction materials, they do not have the combination of ingredients commonly used in friction materials needed to meet the rigorous standard tests for friction materials used in automotive transmissions. Also, as described in U.S. Pat. No. 5,234,740 (Reeves et al.), slip control sheeting is known comprising a backing having first and second major surfaces with an array of protrusions on the first major surface, useful for covering, e.g., gymnastics apparatuses, and tool and racquet handles. The protrusions formed in Reeves et al. do not contain granular carbon friction particles, among other things, needed to provide a friction material suitable for automotive transmission applications, such as a clutch plate member.

U.S. Pat. No. 5,083,650 (Seitz et al.) disclose a friction member having a roughened surface suitable for use as a friction facing member in a transmission. The friction member of Seitz et al. involves a heat-resistant paper supporting granular carbon friction particles resin-bonded via underlying and overlying thermoset polymeric binder containing carbon filler particles. An undulated (roughened) contour is formed on the surface of the friction member of Seitz et al. It would be desirable to form a friction facing layer with increased texture control and without the need for providing sequential coatings as employed in Seitz et al.

SUMMARY OF THE INVENTION

In accordance with the present invention, friction materials and clutch plate members are presented having a patterned friction surface. Methods of making and using the inventive friction materials are also presented. One embodiment of the invention is a friction material for a friction facing member, the friction material comprising: a backing having a front surface and a rear surface, and a plurality of precisely shaped composites forming a patterned friction coating on the front surface of the backing, the precisely shaped composites comprising a plurality of friction particles dispersed in a binder.

The plurality of precisely shaped friction composites define an overall friction surface topography having a three-dimensional pattern, such as an array having a non-random pattern. This patterned friction surface generally comprises a plurality of peaks or asperities associated with the shape of each friction composite, with adjacent friction composite peaks or asperities separated from one another. Since the peaks are separated from one another, cavities are formed therebetween. These cavities provide a means for dynamically retaining a fluid, e.g., transmission fluid. The precisely shaped friction composites each have a precise shape defined by a distinct and discernible boundary. Adjacent shaped composites are preferably the same shapes, although different shapes are also contemplated to be within the scope of the invention. It is preferred that the composites are equally spaced apart, although random spacing is also contemplated within the scope of the invention.

Preferably, each of the plurality of precisely shaped friction composites comprise a three-dimensional shape selected from the group of parallelpiped, cubic, conical, truncated pyramid, cylindrical, pyramid, and mixtures thereof, more preferably, each of the plurality of precisely shaped composites comprise a pyramid having a triangular-shaped base, even more preferably, each of the plurality of precisely shaped friction composites comprise a pyramid having a quadrilateral-shaped base, and most preferably, each of the pyramids include flat upper surfaces. Optionally, the precisely shaped composites may further comprise an additive.

In another embodiment, the friction material is resilient, i.e., the friction material has an elastic modulus of about $10^7$ dynes/cm$^2$ or less, and more preferably about $10^6$ dynes/cm$^2$ to about $10^7$ dynes/cm$^2$. Elastic modulus typically is determined using a Rheometrics Solids Analyzer Model RSA II, from Rheometrics Scientific, of Piscataway, N.J. In one preferred embodiment, the friction material further comprises a tie layer on the rear surface of the backing, more preferably, the tie layer comprises a fluoroelastomer, preferably the elastic modulus is about $3.5\times10^6$ dynes/cm$^2$. In another preferred embodiment, the elastic modulus is about $4.5 \times 10^6$ dynes/cm$^2$, wherein the patterned friction coating has a coefficient of friction of about 0.14 or greater at an energy level of about 26.62 kJ.

Preferably, the friction material includes friction particles selected from the group of an organic material, a metallic material, a semimetallic material, an inorganic material, and mixtures thereof, more preferably, the friction particles comprise an organic material, even more preferably, the organic material comprises coke, wherein the coke is selected from the group of metallurgical coke, petroleum coke, coconut shell activated carbon, and mixtures thereof.

The patterned friction coating is formed from a coatable binder precursor slurry comprising a plurality of friction particles and a resin, preferably a thermosetting resin. While in the slurry form, the resin therein is not polymerized or cured. This results in the slurry being able to flow or to be coated onto the backing or into the cavities of the production tool (thus defining the term "coatable"). The binder precursor slurry is then exposed to conditions such as an energy source to cure or polymerize the resin in the binder precursor slurry into a binder, resulting in the binder precursor slurry being converted into a friction coating.

As stated, although thermosetting resins are typically preferred, it is within the scope of this invention to use thermoplastic resins as binders. During the processes of this invention, the thermoplastic resin is in a molten or flowable state. Upon cooling of the thermoplastic resin, it is converted into a solidified binder and a friction composite is formed. Preferred thermoset binders are derived from addition polymerizable resins, more preferably free radical curable resins. The preferred energy source is radiation energy, such as electron beam. A particularly preferred binder comprises the polymerized reaction product of an acrylate monomer and an isocyanurate derivative having at least one pendant acrylate group. Another preferred binder is a crosslinked system prepared from an aminoplast resin having acrylamide groups, preferably from a mixture of an aminoplast resin having acrylamide groups and an aminoplast resin having acrylate groups. Another preferred binder is a crosslinked system prepared from a mixture comprising an aminoplast resin having acrylamide groups, and an aminoplast resin having acrylate groups and at least one resin having at least one pendant acrylate group. Preferably, the at least one resin having at least one pendant acrylate group is selected from the group of a monofunctional acrylate monomer, a multifunctional acrylate monomer, a urethane acrylate, an epoxy acrylate, an isobornyl acrylate, a polyester acrylate, an acrylated acrylic, a silicone acrylate, a polyether acrylate and mixtures thereof, more preferably, the at least one resin having at least one pendant acrylate group is selected from the group of a urethane acrylate, an isobornyl acrylate, a silicone acrylate and mixtures thereof. The friction material preferably has an elastic modulus of about $10^7$ dynes/cm$^2$ or less.

The friction material of the invention includes the backing which preferably is a nonwoven paper having a plurality of aramid staple fibers bound together by an acrylic latex.

In yet a further embodiment of the invention, a friction material for a friction facing member useful for transmitting power in a power transmission mechanism includes a nonwoven paper comprising a plurality of aramid staple fibers bound together by an acrylic latex, the paper having a from and back surface, and a pyramidal patterned friction coating attached to the front surface of the backing, the patterned friction coating comprising a plurality of precisely shaped pyramidal friction composites, each friction composite comprising a plurality of coke particles dispersed in the binder, the binder comprising a polymerized reaction product of trimethylol propane triacrylate and triacrylate of tris (hydroxy ethyl)isocyanurate.

In another embodiment of the invention, a friction material for a friction facing member includes a backing having a front surface and a rear surface; and a plurality of precisely shaped composites forming a patterned friction coating on the front surface of the backing, the precisely shaped composites comprising a plurality of friction particles dispersed in a binder, wherein the friction material has an elastic modulus of about $10^7$ dynes/cm$^2$ or less. Preferably, the friction material has a coefficient of friction of about 0.14 or greater at an energy level of about 26.62 kJ at about 200 cycles. More preferably, the binder comprises a crosslinked system prepared from a mixture comprising an aminoplast resin having acrylamide groups, and an aminoplast resin having acrylate groups and at least one resin have at least one pendant acrylate group selected from the group of a monofunctional acrylate monomer, a multifunctional acrylate monomer, a urethane acrylate, an epoxy acrylate, an isobornyl acrylate, a polyester acrylate, an acrylated acrylic, a silicone acrylate, a polyether acrylate and mixtures thereof, and more preferably, a urethane acrylate, an isobornyl acrylate, a silicone acrylate and mixtures thereof.

The inventive friction materials may be adhered to substrates such as metal clutch plates, synchronizer rings, brake pads, train tracks, and the like. Thus, another aspect of the invention is an article comprising one of the inventive friction materials adhered to a substrate, preferably a metal substrate. For example, in one embodiment of this invention, there is a clutch plate member for operating in a fluid medium to transmit torque to a metal mating surface situated on an opposing clutch plate member, comprising a friction facing layer constructed the same as the above-mentioned friction material that is adhesively bonded to a metal support plate. Typically, a heat resistant adhesive such as a nitrile phenolic resin is used to adhere the friction material to metal plates, although this is not a requirement.

In another embodiment of the invention, an apparatus for transmitting torque includes a first plate member for operating in a fluid medium to transmit torque to a mating surface situated on an opposing second plate member, the first plate member having a friction facing material bonded to a support plate, wherein the friction facing material comprises: a backing having a front surface and a rear surface, and a plurality of precisely shaped friction composites defining patterned friction coating attached to the front surface of the backing, the precisely shaped friction composites comprising a plurality of friction particles dispersed in a binder, and a rotating member capable of engagement with the first plate member at a friction facing material interface. This apparatus is useful in a number of torque transmitting application: wherein the first plate member and the opposing second plate member comprise a clutch; wherein first plate member and the opposing second plate member comprise a brake mechanism; or wherein the first plate member and the opposing second plate member comprise a torque converter for an automatic transmission.

In yet another embodiment, a method for altering a vehicle's speed comprising the apparatus for transmitting torque, as described above, includes the step of engaging the first plate member in the presence of a fluid to the rotating member at a friction facing material interface such that a coefficient of friction is increased between the plate member and the rotating member to transfer the torque between the plate member ad the rotating member to alter the vehicle's speed.

The friction materials of the invention may be employed in a variety of methods. One method of using the friction materials of the invention comprises attaching the friction material to a first member, rotating the first member in a fluid and in the presence of a second member, thereby causing the second member to be rotated. Another method of using the friction materials of the invention is to slow or stop a vehicle, the method comprising applying the friction material to a stationary member of the vehicle, rotating a second member of the vehicle in a touching fashion against the friction material, thereby increasing the coefficient of friction between the stationary member and the second member and helping to slow the vehicle. Another method of using the friction materials of the invention is to help slow a vehicle which traverses tracks, the method comprising applying the friction material to a portion of the vehicle and/or track, rotating a member of the vehicle in a touching fashion against a friction material applied to the tracks, thereby increasing the coefficient of friction between the track and the rotating member and helping to slow the vehicle.

Further advantages of the invention will become apparent from the drawings and description which follow.

DESCRIPTION OF PREFERRED EMBODIMENTS

The present invention provides friction materials and clutch plate members. If the inventive friction materials are used in torque converter clutches (i.e., wet clutches) in automatic transmissions and slipping clutches, the inventive materials have the ability to retain automatic transmission fluid at the interface between the friction surface and a contact surface. Then, during gear shifting, since the transmission fluid is retained at the interface, shifting occurs easier and more efficiently. The friction material of the present invention also is usable in synchronizer rings in manual transmissions. In this synchronizer ring environment, the patterned surface has the ability to penetrate the oil film typically present on the synchronizer rings.

The inventive friction materials preferably exhibit a midpoint dynamic torque ranging from about 150 to 180 Newton-meters (N-m), a delta torque less than 30 N-m, maximum torque greater than 150 N-m, and an engagement time from about 0.40 second to about 0.60 second, all as measured in accordance with standard friction material tests (see the examples section).

Figure 1:
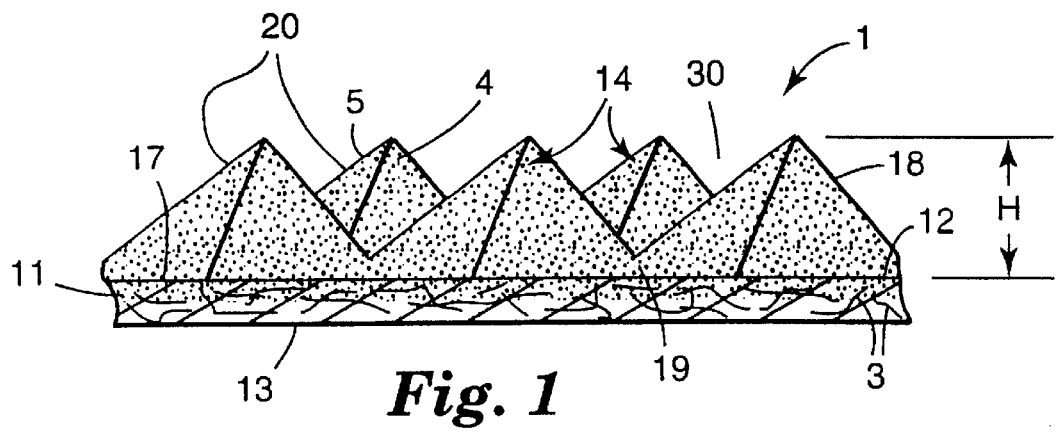
FIGS. 1–2 are enlarged side elevation views of friction materials made according to this invention.

Referring to FIG. 1, friction material 1 comprises a backing 11 having a front surface 12 and a back surface 13. The backing may optionally include a plurality of reinforcing fibers 3, such as for example aramid polymer staple fibers discussed below. Bonded to front surface 12 of backing 11 is a friction coating 14. Friction coating 14, as defined herein, is that portion of the coatable binder precursor slurry containing friction particles, that, after curing, resides on the upper or front surface of the backing and does not penetrate into the backing. Friction coating 14 has an inner surface 17 and a patterned friction surface 18 defined by a plurality of precisely shaped friction composites 20, which are pyramidally-shaped in this illustration. Friction composites 20 comprise a binder 5 and a plurality of friction particles 4, as described herein. The binder 5 acts as the means of attachment of the composites to the front surface 12. The friction composites 20 are bonded to front surface 12 by a continuous land layer 19 of the friction composite material extending beneath and between the friction composites 20. The backing 11 can be continuously covered with the friction composites 20 and lands 19, such that the backing 11 would not be exposed. The friction composites 20 and the land area 19 are formed at the same time from the same slurry when deposited upon a backing 11 with production tools and techniques described herein. Height "H" of the composites 20 is measured relative to the front surface 12. The land 19 generally has a vertical thickness above the front surface 12 (or front surface plus any primer layer) of no greater than 50%, preferably about 1% to about 25%, of the vertical height H of the composites. Typically, the land 19 will have a thickness less than about 10 micrometers where the height of the composites 20 is about 50 micrometers to about 1020 micrometers. Also, as seen in FIG. 1 (and FIG. 2) a portion of binder 5 and friction particles 4 dispersed therein seeps into and impregnates the fibrous backing 11 and 21 through a portion of the thickness thereof.

The expression "precisely shaped friction composites", as used herein, refers to friction composites having a shape that has been formed by curing the flowable mixture of friction particles and curable binder while the mixture is both being borne on a backing and filling a cavity on the surface of a production tool (described herein). Such a precisely shaped friction composite would thus have precisely the same shape as that of the cavity. The plurality of such composites provide three-dimensional shapes that project outward from the surface of the backing and land portion in a non-random pattern, namely the inverse of the pattern of the production tool. Each composite is defined by a boundary, the base portion of the boundary generally being the interface with the front surface of the backing to which the precisely shaped composite is adhered. The remaining portion of the boundary is defined by the cavity on the surface of the production tool in which the composite was cured.

Figure 3:
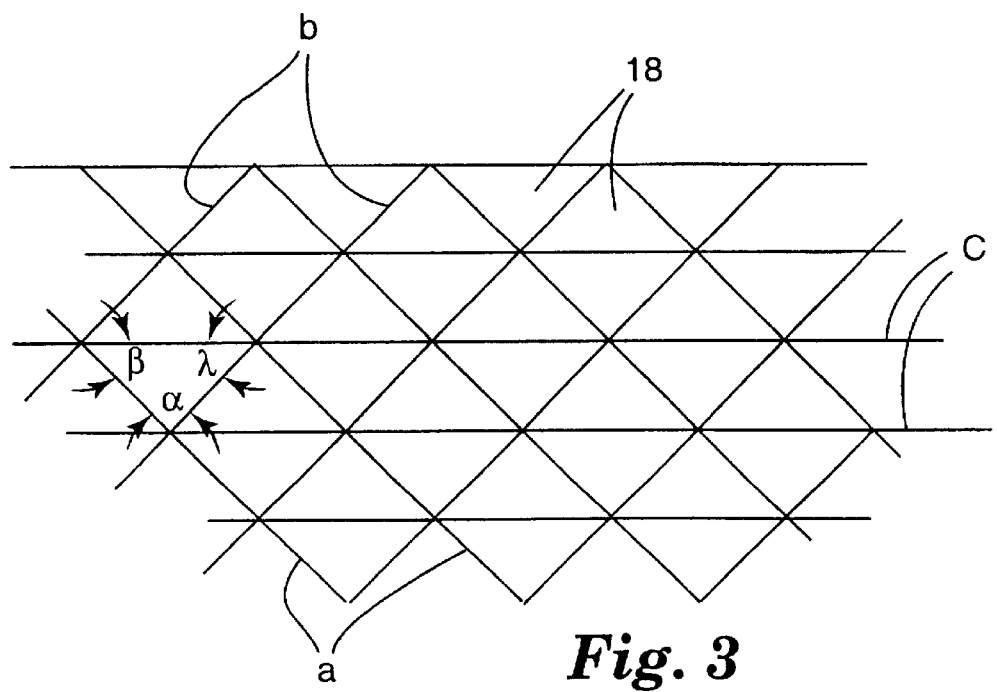
FIG. 3 illustrates the friction material of FIG. 1 in plan view.

FIG. 3 illustrates the friction material of FIG. 1 in plan view. A pattern of three intersecting sets of parallel v-shaped ridges performed in the production tool yields patterned friction surface 18. The three-dimensional composite structures are defined by each set of crossing grooves which are imparted by the production tool ridges and are identified as a, b, and c. The base of each individual friction composite 20 is defined by one groove of each of the three sets. The three sides of the base of each three-sided pyramid are typically relatively equal in length. This can be controlled by selection of the intersection angles between the three sets of grooves, i.e., alpha, beta, and gamma. Each side of the base of a friction composite and the peak of that composite defines a plane, referred to herein as a face of the friction composite. The faces of each protrusion are preferably relatively equal in area. The formation of square-based pyramids by a complementary pattern of four intersecting grooves in the production tool is also contemplated within the scope of the invention. In general, the cross sectional area of the shape will decrease away from the backing.

Figure 2:
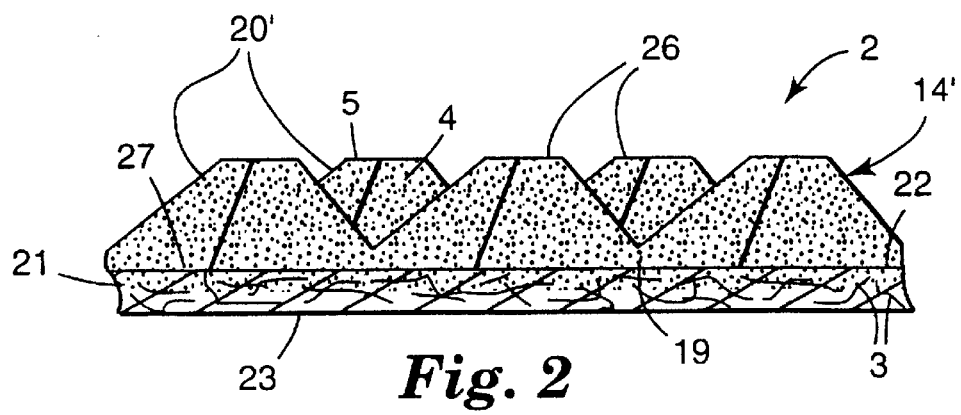

FIG. 2 illustrates a second friction material 2 similar in all respects to the friction material illustrated in FIG. 1, with the exception that the pyramidal friction composites 20' comprised of friction particles 4 dispersed in binder 5 are truncated (flat-topped) in shape. This creates surfaces 26 generally parallel to backing 21. The composites 20' have bases 27 attached to front surface 22 of the backing 21 via land portion 19. The flat-topped pyramids can be formed directly by complementary flat-bottoms in the bases of the production tool cavities described herein, or alternatively, the pyramids can originally be formed with peaks and then rendered "flat-topped" by skiving off the top or by another similar mechanical or grinding process.

Figure 6:
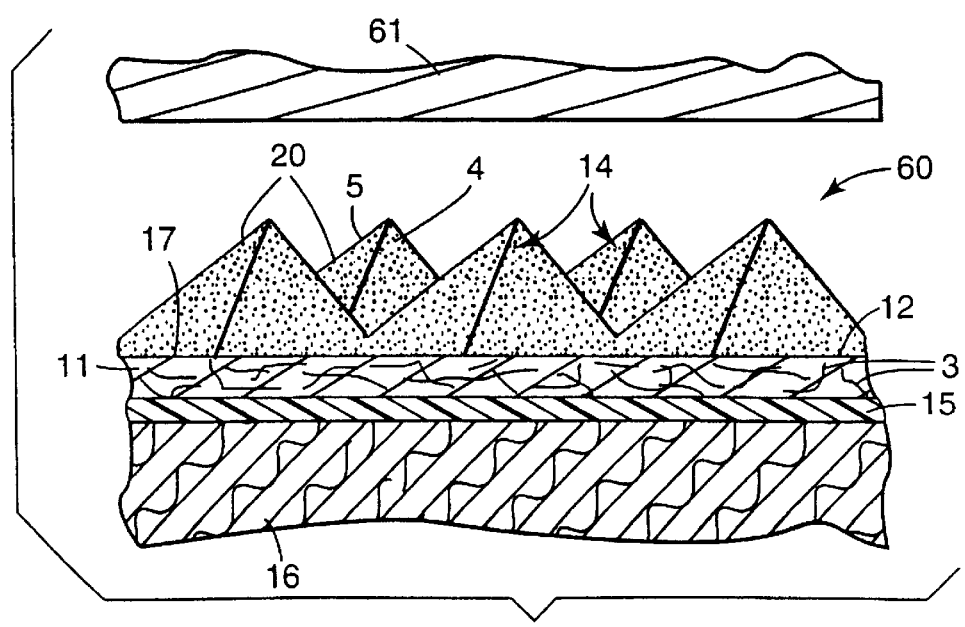
FIG. 6 is an enlarged side elevation view of one embodiment of the friction material illustrated in FIG. 1 attached to a metal substrate.
Figure 7:
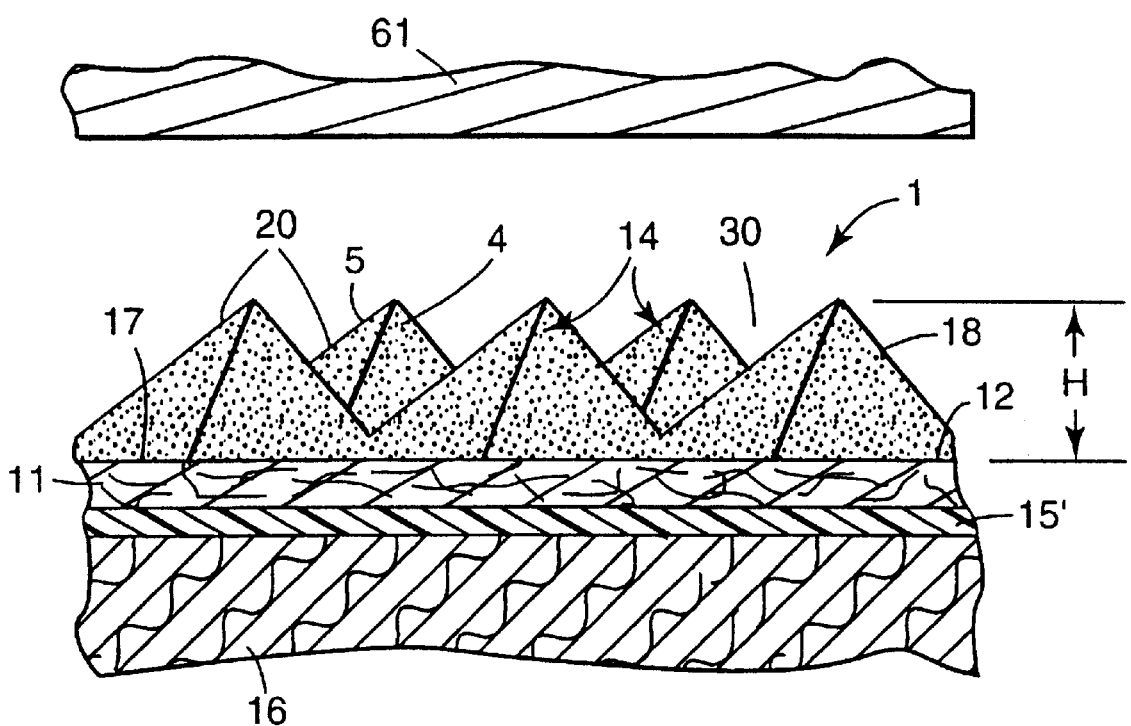
FIG. 7 is an enlarged side elevation view of another embodiment of the friction material illustrated in FIG. 1 attached to a metal substrate.

Referring to FIG. 6, the friction material 1 of FIG. 1 is directly bonded to a substrate 16, such as a metal substrate. Layer 15 adheres the backing 11 to the substrate 16. Preferably, the layer 15 is a heat resistant adhesive, such as a nitrile phenolic resin. Alternatively, as shown in FIG. 7, the backing 11 is bonded to the substrate 16 by including a tie layer 15'. The friction material including the tie layer 15' preferably has an elastic modulus of about $10^7$ dynes/cm$^2$ or less, more preferably from about $10^6$ dynes/cm$^2$ to about $10^7$ dynes/cm$^2$, and most preferably about $3.5 \times 10^6$ dynes/cm$^2$. Preferably, the tie layer 15' is formed from an elastomeric material and is also heat resistant and is resistant to petrochemicals, such as transmission fluid. For example, tie layer 15' can be formed from a composition including a fluoropolymer, preferably a fluoroelastomer. While not being bound by any particular theory, it is believed that either the friction material or a combination of the friction material including a tie layer having an elastic modulus of about $10^7$ dynes/cm$^2$ or less may increase the flexibility, resilience and/or compliance of the friction material. It is further believed that this increased compliance may then increase the comformability of the friction material to an opposing substrate, which may likely increase the coefficient of friction.

Friction Coating

As illustrated in FIGS. 1 and 2, the points of each adjacent friction composite 20 (20') have unconnected distal ends spaced from backing 11 (21) while being connected at their bases. This separation at outer portions of the shapes leads to valleys or cavities between adjacent friction composites. While FIG. 1 shows abutting composites at their bases, it is also possible to space the composites apart from one another such that the land area is exposed between the composites. It is also possible to provide the boundaries forming the individual friction composites in FIGS. 1 and 2 as irregularly shaped and not well defined. The distinct and discernible boundaries are readily visible and clear when a cross section of the friction material is examined under a microscope such as an optical or scanning electron microscope. These distinct and discernible boundaries form the outline or contour of the precise shape. These boundaries separate to some degree one friction composite from another and also distinguish one friction composite from another.

In some instances the boundaries forming the shape are planar. For shapes that have planes, there are at least three planes (noninclusive of the base or any top of the shape). The number of planes for a given shape can vary depending upon the desired geometry, for instance the number of planes can range from three to over 20. Generally, there are from three to ten planes, preferably three to six planes. These planes intersect to form the desired shape. The angles at which these planes intersect determine the shape dimensions.

The friction composite shape can be any shape, but it is preferably a geometric shape in cross-section or three-dimensions being such as a rectangle, cone, truncated pyramid, semicircle, circle, triangle, square, hexagon, pyramid, octagon, gum drops, conical and the like. The preferred shapes are triangular-based and quadrilateral-based pyramids. It is also preferred that all of the friction composites decrease in cross sectional area proceeding in the direction away from the backing up towards the distal end, whether it be pointed, flat topped or rounded. This variable cross-section improves the release property of the cured composites from the tooling. With usage, area of the variable cross-section increases, thereby reducing the load/ area as well as the associated wear. In general there are at least 5 friction composites per square centimeter, in some instances, at least 500 friction composites per square centimeter in embodiments such as illustrated in FIGS. 1 and 2 In general, a range of about 120 to about 1150 be optimal depending on the circumstances. For friction material applications, the height H (e.g., see FIG. 1) of the friction composites generally is in the range of about 88 micrometers to about 534 micrometers.

In another aspect of this invention, a portion of the friction composites have an adjacent friction composite of a different dimension. In this aspect of the invention, at least about 10%, preferably at least about 30%, more preferably at least about 50% and most preferably at least about 60% of the friction composites have an adjacent friction composite that has a different dimension. These different dimensions can pertain to the friction composite shape, angle between planar boundaries or dimensions of the friction composite. Methods of producing this type of production tooling are described in International Publication WO 95/07797 (Hoopman et al).

Binder of the Friction Coating

The friction coating is formulated to provide the desired properties of the inventive friction material for its intended use. The friction coating typically exhibits a coefficient of friction and a consistent level of friction suitable for a wide variety of applications, at a variety of temperatures and pressures, and is relatively long lasting. In addition, the friction coating is generally compatible with the engaging surface and with fluids that come in contact with the friction coating. In automotive transmission and brake usage, the friction coating is preferably formulated so that the friction materials are relatively quiet during operation with minimal sticking and/or slipping (e.g., shudder) during engagement.

The friction coating of the invention includes a binder and a plurality of friction particles dispersed therein. The friction coating is bonded to the front side of the backing preferably by means of the binder, although an intermediate adhesive can be used. The binder can be any material that provides the necessary properties to make a good performing, long lasting friction material. The binder should also be capable of withstanding the heat and forces to which the friction material is subjected.

The friction coating is derived from a binder precursor slurry comprising a plurality of friction particles and a binder precursor. The binder precursor slurry is capable of being coated onto the backing or a production tool, as further explained herein below, while the binder precursor is in a flowable state that is capable of solidifying. During processing, the resin in the binder precursor is solidified to form an oligomeric or polymeric material. The solidification can be achieved by curing (i.e., polymerizing and/or crosslinking) or by drying (e.g., driving off a liquid) and curing. The binder precursor can be organic solvent-borne, water-borne, or 100% solids (i.e., a substantially solvent-free) compositions. That is, the binder may be formed from a 100% solids formulation or it may be coated out of a solvent (e.g., a ketone, THF, or water) with subsequent drying and curing. If a solvent is used, it is one that does not react with the other components of the precursor, but can be driven off by heat, for example, although complete elimination is not necessarily required. Preferably, the binder precursor is a 100% solids formulation, which is substantially solvent-free (i.e., less than about 1 wt. %).

The binder precursor is one that is capable of irreversibly forming a cured oligomeric/polymeric material and is often used interchangeably with the term "thermosetting" precursor. The term "thermosetting" precursor is used herein to refer to reactive systems that irreversibly cure upon the application of heat and/or other sources of energy, such as E-beam, ultraviolet, visible, etc., or with time upon the addition of a chemical catalyst, moisture, or the like. The term "reactive" means that the components of the binder precursor react with each other (or self react) either by polymerizing, crosslinking, or both, using any of the mechanisms listed above. These components are often referred to as resins. As used herein, the term "resin" refers to polydisperse systems containing monomers, oligomers, polymers, or combinations thereof.

Thus, materials suitable for forming the binder are binder precursors comprising reactive components, i.e., materials capable of being crosslinked and/or polymerized, by a wide variety of mechanisms. Examples include, but are not limited to: amino resins such as alkylated urea-formaldehyde resins, melamine-formaldehyde resins, and alkylated benzoguanamine-formaldehyde resins; acrylate resins (including acrylates and methacrylates) such as acrylates; alkyd resins such as urethane alkyd resins; polyester resins; aminoplast resins; urethane resins; phenol formaldehyde resins (i.e., phenolic resins) such as resole and novolac resins; epoxy resins such as bisphenol epoxy resins; isocyanates; isocyanurates; silicone resins; cashew nut shell resins, polyimide resins, and the like. Such reactive binder precursor components are capable of being cured by a variety of mechanisms (e.g., condensation or addition polymerization) using, for example, thermal energy, radiation energy, etc, or a combination of mechanisms.

Binder precursors that can be cured with rapidly acting forms of radiation energy (e.g., requiring application for less than five minutes and preferably for less than five seconds) are particularly preferred. Electron beam (E-beam) radiation is especially desired because of its ability to penetrate heavily pigmented coatings, its speed and efficient use of applied energy, and its ease of control. Other useful forms of radiation energy include ultraviolet/visible light, nuclear radiation, infrared, and microwave radiation. Depending on the particular curing mechanism, the binder precursor can further include a catalyst, initiator, or curing agent to help initiate and/or accelerate the polymerization and/or crosslinking process.

Another type of initiator system particularly desired is a thermal initiator, i.e., one which requires heat to initiate the polymerization. A thermal initiator is also preferred because of its ability to penetrate heavily pigmented coatings, its speed and efficient use of applied energy, and its ease of control. A thermal initiator can be used alone or in combination with another initiator, such as a UV photoinitiator which can be used in an exothermic system compatible with the thermal initiator In this type of system, UV radiation can be used to initiate the reaction, which then provides the heat needed to initiate the thermal initiator. With the addition of the thermal initiator to the system, any requirement of post-curing of the material may be eliminated. Examples of commercially available thermal initiators include VAZO 52 and VAZO 64 FREE RADICAL SOURCES both from DuPont, Wilmington, Del., and TRIGONOX 21-C50 (tert-butylperoxy-2-ethylhexanoate) from Akzo Nobel, Chicago, Ill. Of course, the initiator selected for the application depends on the chemistry of the system and on the amount of heat available in the reaction.

Reactive binder precursor components capable of being cured by thermal energy and/or time with the addition of catalysts include, for example, phenolic resins such as resole and novolac resins, epoxy resins such as bisphenol A epoxy resins, and amino resins such as alkylated urea-formaldehyde resins, melamine-formaldehyde resins, and alkylated benzoguanamine-formaldehyde resins. The binder precursor containing reactive components such as these can include free radical thermal initiators, acid catalysts, etc., depending on the resin system. Examples of thermal free radical initiators include peroxides such as benzoyl peroxide, azo compounds, benzophenones, and quinones. Typically, such reactive seal coat precursor components need temperatures greater than room temperature (i.e., 25–30° C.) to cure, although room-temperature curable systems are known.

Resole phenolic resins have a molar ratio of formaldehyde to phenol, based upon weight, of greater than or equal to about 1:1, typically about 1.5:1.0 to about 3.0:1.0. Novolac resins have a molar ratio of formaldehyde to phenol, based upon weight, of less than about 1:1. Examples of commercially available phenolic resins include those known by the designations DUREZ and VARCUM from Occidental Chemicals Corp., Dallas, Tex.; RESINOX from Monsanto, St. Louis, Mo.; and AEROFENE and AEROTAP from Ashland Chemical Co., Columbus, Ohio.

Epoxy resins have an oxirane and are polymerized by ring opening. They can vary greatly in the nature of their backbones and substituent groups. For example, the backbone may be of any type normally associated with epoxy resins, and the substituent groups may be any group free of an active hydrogen atom that is reactive with an oxirane ring at room temperature. Representative examples of acceptable substituents include halogens, ester groups, ether groups, sulfonate groups, siloxane groups, nitro groups, and phosphate groups. One of the most commonly available epoxy resins is the reaction product of diphenylol propane (i.e., bisphenol A) and epichlorhydrin to form 2,2-bis[4-(2,3-epoxypropoxy)phenyl]propane (a diglycidyl ether of bisphenol A). Such materials are commercially available under the trade designations EPON (e.g., EPON 828, 1004, and 1001F) from Shell Chemical Co., and DER (e.g., DER 331, 332, and 334) from Dow Chemical Co., Midland, Mich. Other suitable epoxy resins include glycidyl ethers of phenol formaldehyde novolac available under the trade designation DEN (e.g., DEN 431 and 428) from Dow Chemical Co.

Amino resins are the reaction product of formaldehyde and an amine. The amine is typically urea or melamine. The most common amino resins are the alkylated urea-formaldehyde resins and melamine-formaldehyde resins, although alkylated benzoguanamine-formaldehyde resins are also known. Melamine-formaldehyde resins are typically used where outdoor durability and chemical resistance are desired. Typically, however, amino resins are not used by themselves because they tend to be brittle. Thus, they are often combined with other resin systems. For example, they can be combined with alkyds, epoxies, acrylics, or other resins that contain functional groups that will react with the amino resin, to take advantage of the good properties of both resin systems.

In one preferred embodiment, the binder precursor includes at least one resin having at least one pendant acrylate group. A suitable resin having at least one pendant acrylate group is preferably selected from the group of a monofunctional acrylate monomer, a multifunctional acrylate monomer, a urethane acrylate, an epoxy acrylate, an isobornyl acrylate, a polyester acrylate, an acrylated acrylic, a silicone acrylate, a polyether acrylate and mixtures thereof, more preferably, the at least one resin having at least one pendant acrylate group is selected from the group of a urethane acrylate, an isobornyl acrylate, a silicone acrylate and mixtures thereof. While not wishing to be bound by any particular theory, it is believed that by including at least one resin having pendant acrylate groups may increase the flexibility, resilience, and/or compliance of the friction material. It is believed that an increased resilience of the friction material may also increase the conformability of the friction material which similarly increases the surface area contact of the friction material to an opposing substrate. It is farther believed that this phenomenon likely results in an apparent increase in the coefficient of friction. However, increasing the flexibility, resilience, and/or compliance of the friction material is but one characteristic. Other characteristics which may conflict with increasing the coefficient of friction are, for example, the chemical resistance of the friction material (e.g., resistant to petrochemicals such as transmission fluids) and the durability of the friction material, particularly when the friction material is to be used in such applications as a transmission clutch or a brake liner. Preferably, the friction material including binder precursor including at least one resin having at least one pendant acrylate group has an elastic modulus of about $10^7$ dynes/$cm^2$ or less, more preferably about $10^6$ dynes/$cm^2$ to about $10^7$ dynes/$cm^2$, and most preferably about $4.5\times10^6$ dynes/$cm^2$.

As used herein, the terms "acrylate" and "acrylate functional" compound includes both acrylates and methacrylates, whether they be monomers, oligomers, or polymers. A urethane acrylate is a diacrylate ester of hydroxy terminated isocyanate extended polyester or polyether. It can be aliphatic or aromatic. Examples of commercially available urethane acrylates include those known by the trade designations PHOTOMER (e.g., PHOTOMER 6010) from Henkel Corp., Hoboken, N.J., EBERCRYL 220 (hexafunctional aromatic urethane acrylate of molecular weight 1000), EBECRYL 284 (aliphatic urethane diacrylate of 1200 molecular weight diluted with 1,6-hexanediol diacrylate), EBECRYL 4827 (aromatic urethane diacrylate of 1600 molecular weight), EBECRYL 4830 (aliphatic urethane diacrylate of 1200 molecular weight diluted with tetraethylene glycol diacrylate), EBECRYL 6602 (trifunctional aromatic urethane acrylate of 1300 molecular weight diluted with trimethylolpropane ethoxy triacrylate), and EBECRYL 8402 (aliphatic urethane diacrylate of 1000 molecular weight), all available from UCB Chemical, Smyrna, Ga., SARTOMER (e.g., SARTOMER 9635, 9645, 9655, 963-B80, 966-A80, etc.) from Sartomer Co., West Chester, Pa.; and UVITHANE (e.g., UVITHANE 782) from Morton International, Chicago, Ill. Other useful resins having at least one pendant acrylate group include those available under the trade designation SARTOMER CN966-J75 (a difunctional aliphatic urethane acrylate oligomer blended with 25% isobornyl acrylate) from Sartomer Co., West Chester, Pa., and EBECRYL 350 (a silicone ester acrylate oligomer) from UCB Chemical, Smyrna, Ga.; aromatic acid methacrylate half ester blended with either difunctional (SR506) or trifunctional (SR454) monomer, available under the tradenames SB570A20 and SB510G35, respectively; and aromatic acid acrylate half ester blended with either monofunctional (SR334) or trifunctional (SR454) monomers, available under the trade designations SB520E35 and SB520M35. respectively, all commercially available from Sartomer Co., West Chester, Pa.

Friction Particles

The term "friction particle" as used herein means any material added to the friction coating to increase, decrease, or otherwise modify the coefficient of friction. The friction particles can be in the form of non-randomly or randomly shaped individual particles, precisely shaped preformed particles comprised of individual particles bound together by a binder (as disclosed U.S. Pat. No. 5,500,273. (Holmes et al.)), or milled fibers. The size of said randomly shaped individual-particles may range from about 0.1 micrometer to about 1000 micrometers, preferably from about 1 micrometer to about 500 micrometers, more preferably from about 50 micrometers to about 250 micrometers. The precisely shaped preformed particles, when used, have no dimension greater than about 2500 micrometers, and preferably include a plurality of randomly shaped individual particles. The length of milled fibers, when used, may range from about 0.1 micrometer to about 1000 micrometers, preferably from about 50 micrometers to about 500 micrometers. The aspect ratio of the fibers is preferably at least about 1:1, more preferably at least about 2:1.

Examples of suitable classes of friction particles useful in this invention include organic materials, metallic materials, semimetallic materials, and nonmetallic inorganic materials. Examples of useful organic particulate materials include natural and synthetic graphite, coke, and the like. Examples of metallic materials include metal particles and fibers comprised of carbon steel, gray cast iron, stainless steel, copper, aluminum, titanium, brass, nickel, zinc and the like. Examples of useful semimetallic materials include iron powder in conjunction with a small amount of steel fibers. Examples of useful nonmetallic inorganic materials include ceramic materials such as alumina, calcined alumina, silicon carbide, calcined kyanite, and silica. Useful non-randomly shaped particles are, for example, those known under the trade designations "MACROLITE", and "ZEEOSPHERES", both available from Minnesota Mining and Manufacturing Co., St. Paul, Minn., ("3M"), which are ceramic particles. During the selection of the specific friction particulate, care should be taken to ensure that the friction coating is not too "abrasive" such that it abrades or prematurely wears away the engaging surface.

One preferred friction particulate is granular carbon such as metallurgical coke or petroleum coke having generally irregular shapes. These carbon particles are commercially available from suppliers such as Asbury Graphite Mills, Inc., Asbury, N.J. Particularly preferred are those having the trade designations "4249" and "4349" from Asbury Graphite Mills, Inc. The particle size distribution of these carbon particles are given in the examples. Preferably, the friction particles consist essentially of carbon particles having an average particle size ranging from about 20 micrometers to about 50 micrometers. Such carbon particles consist primarily of elemental carbon, and although primarily coke, may include carbon black or graphite. "Coke" is an amorphous form of carbon and is made from the carbonization of coal or petroleum residues in the absence of air.

As mentioned previously, there are several suitable types of coke including metallurgical coke and petroleum coke. Coal derived cokes generally contain about 6% to about 16% ash. On the other hand, the petroleum coke particles generally contain less than about 5% by weight of inorganic materials other than carbon, such as sulfur and heavy metals such as nickel and vanadium.

"Carbon black" is another amorphous form of carbon made from the thermal or oxidative decomposition of hydrocarbons. Graphite occurs naturally or it can be made synthetically by heating petroleum coke to approximately 2,400° C. in an electric resistance furnace. Also, coconut shell activated carbon, such as disclosed in U.S. Pat. No. 3,738,901 (Masushima), is yet another form of carbon black that can be used.

Precisely shaped preformed particles, which themselves involve friction particles dispersed and bound in a binder, may be produced by the methods described in U.S. Pat. No. 5.500,273 (Holmes et al.). For particularly preferred embodiments, the weight ratio of carbon particles/binder ranges from about one (1) to 5 parts carbon particles to one (1) part binder, with the preferred range being about 1.3 to 2 to one (1) part binder.

Backing

One purpose of the backing is to hold and support the friction coating. The selection of the particular backing employed will depend upon the desired application of the friction material. Typically, the backing should be heat resistant and strong. The heat resistance and strength properties are necessary to ensure that the friction material will withstand the forces and heat generated during use. In some applications, for example when the inventive friction material is employed in synchronizer rings, the backing should be flexible to conform to the blocker ring (i.e., the synchronizer). In other applications, like a brake pad for a disc brake assembly, the backing should be substantially incompressible (after bonding) since the brake pad should be essentially rigid and nonconforming. In preferred embodiments, the backing will be porous, to allow binder precursor slurry to penetrate into the backing during production of the friction material to the extent needed to anchor the friction coating to the surface of nonwoven backing.

It is preferred that the thickness of the backing be very constant or very uniform along its width and length. The thickness should not vary by more than about 20%, preferably not more than about 10% at any point. The backing thickness can range from about 0.05 mm to about 10 mm, typically from about 0.05 mm to about 1.0 mm. A backing thickness of about 0.13 mm is suitable for most applications. The thickness values for the backing of the invention can be measured in accordance with TAPPI 7411 OM Test Method. The thickness selected for the backing is influenced by several considerations, such as sufficient thickness for the resilience desired; as thin as possible for reasons of economy, and as thick as needed for the particular clutch environment requirements.

The backing can be a porous woven or nonwoven material, or a laminate of one or more or these Woven backings are typically made on a textile knitting machine and may be, for example, a twill weave (2 over 1) or a sateen weave 4 over 1). It is generally preferred that the backing be a nonwoven backing, such as a backing made on a paper making machine.

By "porous", in characterizing the backing webs of the invention, it is meant that the binder precursor, as applied to a surface of the backing, can impregnate into the backing web and pass through at least a portion of the thickness of the backing web at 25° C. That is, the binder precursor, as applied to a surface of the backing, does not reside only on the surface of the backing without any impregnation of the web. An amount or coating rate of binder precursor (i.e., via the binder slurry of friction particles) can be used that soaks through the entire thickness of the backing web (i.e., strike through). It also is acceptable, for purposes of the present invention, to apply that amount of binder precursor slurry which will soak sufficiently into the backing web thickness to the extent effective so as to anchor or hold the patterned portion of the friction material residing on the face of the backing to prevent adhesive failure of the coated friction layer in typical transmission and clutch plate applications. The coating amount to achieve this function can be determined empirically in a straightforward manner.

The backing typically and preferably comprises a fibrous material or is made from a fibrous material. The fibers of the fibrous material can be organic (either synthetic or natural) or inorganic fibers, or combination thereof. Examples of synthetic fibers include those made from polycarbonate, polyvinylchloride, polyetherimide, polyethylene, polyurethane, polyester, polysulfone, polystyrene, acrylonitrile-butadiene-styrene block copolymer, polypropylene, acetal polymers, nylon, aramid, polyimide copolymers and physical blends thereof. Examples of natural organic fibers include cotton, wool, silk, cellulose, rayon, hemp, kapok, flax, sisal, jute, manila, and combinations thereof. Examples of suitable inorganic fibers include metallic fibers, alumina fibers, glass fibers, and fibers made from ceramic materials such as those commercially available from 3M under the trade designation "NEXTEL", which comprise about 60–70% alumina, 20–30% silica, and 1–20% boria. Nonwoven mats made using these fibers are available under the trade designations "NEXTEL 312" and "NEXTEL 440". Carbon fiber webs also may be used.

One particularly preferred material useful as a backing in the friction materials of the present invention is a nonwoven paper comprising aramid polymer staple fibers bonded with an acrylic latex to provide a uniform density backing. It has been found that great care must be taken in order to obtain a uniform density, uniform thickness aramid staple fiber nonwoven in order to provide a suitable friction material backing. The aramid staple fibers for this purpose preferably have a length of about 0.5 cm to about 2 cm, and more preferably about 1.0 to about 1.5 cm. At lengths longer than about 2 cm (such as 5 cm or greater), the fibers tend to form dense areas which make the backing unacceptably dense. Fibers shorter than about 0.5 cm (such as 0.05 cm or less) do not easily form backings with adequate handling strength. The backings also preferably have a weight of about 5 g/m$^2$ to about 50 g/m$^2$ (more preferably about 10 g/m$^2$ to about 25 g/m$^2$) to provide sufficient structural support for the friction coating.

Aramid polymers suitable for use in producing the aramid staple fibers are commercially available from I.E. DuPont de Nemours Company, Wilmington, Del. under the trade designations "KEVLAR", "KEVLAR 29", "KEVLAR 49", and "NOMEX". The term "aramid polymer" as used herein means a synthetic polymer resin generally designated in the art as an aromatic polycarbonamide. Such "aramid polymers" are disclosed in U.S. Pat. Nos. 3,652,510 (Blomberg); and 3,699,085 (Johnson), and are thought to be of a polymer of high molecular weight, e.g., having an inherent viscosity of at least about 0.7, characterized by recurring units of the formula.

wherein Ar$^1$ is p-phenylene and/or chloro-substituted p-phenylene and/or 4,4-substituted diphenyl methane, i.e.,

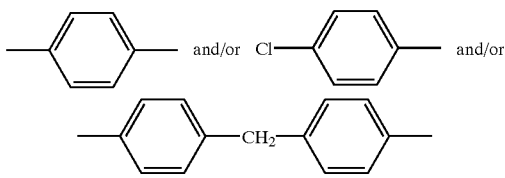

and Ar$^2$ is p-phenylene, i.e.,

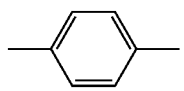

Illustrative examples of polycarbonamides having the definition of the above formula are poly (p-phenylene terephthalamide), chloro-substituted poly (p-phenylene terephthalamide), and copolymers thereof. The designation of the position or location of the substituent groups on the aromatic nuclei of the aramid polymer refers to the location of the substituents on the aromatic diamine, diacid or other co-reactants from which the aramid polymer is prepared.

Although the aramid polymer or aromatic polycarbonamide may consist primarily of carbonamide links (—CONH—) and aromatic ring nuclei, conforming to the formula above, the polymer may contain up to about 20 mole percent and preferably up to about 5 mole percent of nonconforming comonomer units which provide units in the polycarbonamide chain different those listed above, such as aromatic carbonamide units whose chain extending bonds are coaxial or parallel and oppositely directed, e.g., meta-phenylene units, non-aromatic and non-amide groups. It is important that the aramid polymers utilized to obtain the unique advantages of the invention are in the staple form of aramid fibers. The length of the staple fiber, as previously mentioned, is about 0.5 cm to about 2 cm.

The aramid fiber nonwoven papers previously described, are made by conventional paper making techniques, and are commercially available from International Paper of Tuxedo, N.Y. under the trade designations "KEVLAR" Mat Series "8000050", "8000051", "8000052", "8000054", "8000065" and "8000068". These papers include about 8 weight percent to about 18 weight percent acrylic latex used to consolidate the fibers into an integral web. The balance of the weight is made of the aramid fibers.

The backing may optionally contain a treatment to: 1) seal the backside of the backing (i.e., non-coated side); 2) modify some physical property of the backing, and/or 3) aid in processing. The modified physical properties may be strength, rigidity, internal bond strength, heat resistance, adhesion promotion, uniformity, and the like. Examples of such treatments include acrylic lattices, styrene butadiene rubber, vulcanized rubber, nylon polyurethane, phenolic resin, epoxy resin, acrylate resin, isocyanate resin and combinations thereof. A preferred treatment is an acrylic latex. The side of the backing not having the friction coating thereon (back surface 13 in FIG. 1) may also be roughened mechanically to increase adhesion of the friction material by an adhesive to a substrate by any one of a variety of means, including by hand using a wire brush. This roughening treatment should follow the completion of the manufacture of the friction material, so that the impregnating slurry can bolster the integrity of the web before, and to help withstand, this later roughening of the backside.

FIG. 6 illustrates the friction material of FIG. 1 adhered to a metal substrate 16 by an adhesive layer 15. The combination of the precisely shaped friction composites 20 adhered to the metal substrate 16 is typically positioned opposite an engagement surface 61 to form a power transmission mechanism 60, such as a clutch, transmission band or brake device. The engagement surface is typically metal, although it will be understood that it may be a friction material according to the present invention. The adhesive layer 15 can be a single layer or a plurality of adhesive layers, including optional fibrous reinforcements. If the adhesive layer is a single layer, useful adhesives include nitrile phenolic adhesive films, such as those known under the trade designation "MACTAK", available from Raybestos Inc. Crawfordsville, Ind. Other useful adhesives include a nitrile phenolic resin film commercially available from 3M, St. Paul, Minn. under the trade designation "AF15". A suitable example of a multi-layered adhesive layer (15) is a variegated construction of two separate nitrile phenolic films, such as nitrile phenolic film made with 3M "EC-2174", which is available from 3M, sandwiched over an intervening phenolic saturated, aramid fiber paper layer. The aramid fiber paper in such a diversified construction adhesive layer (15) is selected and saturated with a mixture of phenolic resin and carbon per the description, coating formulation and process described in Example 1 of U.S. Pat. No. 5,083,650 (Seitz et al.), with the proviso that the first and second resin coatings are sequentially applied to the aramid paper without depositing any granular carbon particles to the outer surface of the saturated paper in-between the first and second coating applications, unlike Example 1 of U.S. Pat. No. 5,083,650. The coke filled, phenolic saturated paper allows compression of the layers bonded to the steel plates, so that the frictionally active faces are parallel and achieve full contact with the mating friction element, in operation, and, additionally, the paper builds up the caliper of the bonded friction plate to help meet any clutch clearance requirements, if needed. It is contemplated that various other compressible materials having sufficient strength and thermal durability could also be used in lieu of any such phenolic saturated paper used in the adhesive layer (15), as described above.

The backing may also contain additives that alter the chemical and physical properties of the backing. The amount of these additives is chosen to correspond to the desired properties of the coated friction backing. Examples of such additives include toughening materials, shape stabilizers, fillers, dyes, pigments, wetting agents, surfactants, coupling agents, antistatic agents, oils, flame retardants, ultraviolet stabilizers, internal lubricants, antioxidants, and processing aids.

Additives

The friction coating can further comprise optional additives, such as, for example, non-frictional fillers and fibers, pigments, dyes, and antistatic agents. The coatable binder precursor slurries may contain lubricants, wetting agents, thixotropic materials, surfactants, coupling agents, antistatic agents, plasticizers, and suspending agents. The amounts of these materials are selected to provide the properties desired. Some of these additives will also alter the frictional properties of the resulting friction material.

Useful fillers are preferably in the form of particles having a size ranging from about 0.1 micrometer to about 100 micrometers, preferably from about 1 micrometer to about 50 micrometers. Examples of useful non-functional fillers include cured cashew nut resin, cured phenolic particles, rubber particles (such as nitrile rubber particles), metal carbonates (such as calcium carbonate, chalk, calcite, marl, travertine, marble and limestone), calcium magnesium carbonate, sodium carbonate, magnesium carbonate), silica (such as quartz, glass beads, glass bubbles, glass fibers, flour), silicates (such as talc, clays (montmorillonite)), feldspar, mica, calcium silicate, calcium metasilicate, sodium aluminosilicate, sodium silicate), metal sulfates (such as calcium sulfate, barium sulfate, sodium sulfate, aluminum sodium sulfate, aluminum sulfate), gypsum, vermiculite, wood flour, aluminum trihydrate, metal oxides (such as calcium oxide (lime)), aluminum oxide, titanium dioxide) and metal sulfites (such as calcium sulfite).

A coupling agent can provide an association bridge between the cured resin in the binder and the filler particles and/or friction particulate. Coupling agents also seem to provide a rheology that facilitates coating and improves release of the friction material from the production tool. Examples of useful coupling agents include silanes, titanates, and zircoaluminates. A particularly suitable example of a coupling agent is a silane coupling agent available under the trade designation "A-174" from Union Carbide. The binder precursor slurry preferably includes from about 0.01% to about 3% by weight coupling agent.

An example of a useful suspending agent is an amorphous silica particle having a surface area less than about 150 square meters/gram that is commercially available from DeGussa Corp., Rochelle Park, N.J., under the trade designation "OX-50". The use of the amorphous silica particle as fillers in the friction coating is preferred as it imparts improved wear control. The amorphous silica generally is included in an amount of no greater than about 20 parts by weight per 100 parts total weight of friction coating slurry.

Methods of Making the Inventive Friction Materials

One method of making the inventive friction materials of FIGS. 1 and 2 is by molding, a batch process. A backing is coated with a binder precursor slurry as herein described. The backing is then placed in a mold having the inverse of the desired friction surface pattern. The mold is closed and the binder precursor slurry subject to conditions sufficient to cure or harden the resin of the binder precursor slurry, typically by heating. While this method is a way of making the inventive friction material, it is labor intensive.

A more economical method is to use a production tool in a continuous process. The first step in these preferred methods of making the inventive friction materials illustrated in FIGS. 1 and 2 is to prepare a binder precursor slurry by combining together (by any one of a number of suitable mixing techniques) the desired resins, the desired friction particles, and any desired optional additives. Examples of mixing techniques include low shear and high shear mixing, with high shear mixing being preferred. Ultrasonic energy and thermal energy (heating to about 30° C. to about 70° C.) may also be utilized in combination with the mixing step to lower the slurry viscosity. Typically, the friction particles are gradually added into the binder precursor. The amount of air bubbles in the binder precursor slurry can be minimized by exerting a vacuum on the binder precursor slurry during the mixing step. It is important that the binder precursor slurry have a rheology that allows it to be spread or coated onto a backing or production tool and in which the friction particulate does not settle out of the binder precursor slurry.

In one embodiment of the invention, the slurry is coated on at least the front surface of the backing. This coating can be accomplished by any conventional technique such as roll coating, gravure coating, knife coating, spray coating, transfer coating, vacuum die coating, die coating and the like. After the slurry is applied to the backing, a means is used to impart a pattern into the slurry, such as the production tooling described herein. As explained herein, a plastic film may be temporarily applied to the back side of the backing and a squeegee roll or other means used to force the slurry at least partially into the backing. Alternatively, the slurry coating can be applied first into the cavities of the tooling and the coated face of the tooling pressed against a front surface of a backing during cure of the slurry.

Energy Sources

After the binder precursor slurry is coated onto the backing, it is exposed to an energy source to initiate the polymerization of the resin in the binder precursor slurry. Examples of suitable and preferred energy sources include thermal energy and radiation energy. The amount of energy depends upon several factors such as the resin chemistry, the dimensions of the slurry after it is coated, the amount and type of friction particulate and the amount and type of the optional additives. For thermal energy, the temperature is about 30° C. to about 150° C., generally about 40° C. to about 120° C. The exposure time can range from about 5 minutes to over 24 hours, longer times being appropriate for lower temperatures.

Suitable radiation energy sources for use in the invention include electron beam, ultraviolet light, or visible light. Electron beam radiation, which is also known as ionizing radiation, can be used at an energy level of about 0.1 Mrad to about 10 Mrad, preferably at an energy level of about 1 Mrad to about 10 Mrad, and at an accelerating voltage level of about 75 KeV to about 5 meV, preferably at an accelerating voltage level of about 250 KeV to about 300 KeV. Ultraviolet radiation refers to non-particulate radiation having a wavelength within the range of about 200 nanometers to about 400 nanometers, preferably within the range of about 250 nanometers to about 400 nanometers. It is preferred that 300–600 Watt/inch ultraviolet lights are used. Visible radiation refers to non-particulate radiation having a wavelength within the range of about 400 nanometers to about 800 nanometers, preferably in the range of about 400 nanometers to about 550 nanometers If radiation energy is employed, some friction particulate and/or optional additives may absorb the radiation energy to inhibit polymerization of the resin in the binder precursor slurry. If this is observed, higher doses of radiation energy can be employed to the extent needed to compensate for such radiation absorbance by the particulates. Also, the E-beam accelerating voltage may be increased to thereby increase penetration of the ionizing radiation energy. Alternatively, another type of radiation energy can be employed that is not absorbed by the friction particulate.

After this polymerization process is complete, the resin of the binder precursor slurry is converted into a binder and the slurry is converted into a friction coating. The resulting friction material is generally ready to be converted into the desired shape.

Production Tool

A production tool having a plurality of precisely shaped cavities is required during at least one step of the methods of making the friction materials of FIGS. 1–2. These cavities are essentially the inverse shape of the friction composites and are responsible for generating the shape of the friction composites. The dimensions of the cavities are selected to provide the desired shape and dimensions of the friction composites. The friction composites may all have the same shape, or the friction composites may all be of random shapes. If the shape or dimensions of the cavities are not properly fabricated, the resulting production tool will not provide the desired dimensions for the friction composites.

In production tools useful in producing the friction materials of FIGS. 1 and 2, the cavities can be present in a dot like pattern with spaces between adjacent cavities or the cavities can butt up against one another. It is preferred that the cavities butt up against one another. Additionally, the shape of the cavities is selected such that the surface area of the friction composite decreases away from the backing.

The production tool can be a belt a sheet, a continuous sheet or web, a coating roll such as a rotogravure roll, a sleeve mounted on a coating roll, or die. The production tool can be composed of metal, (e.g., nickel), metal alloys, or plastic. The metal production tool can be fabricated by any conventional technique such as engraving, hobbing, electroforming, etching, diamond turning, knurling, and the like. One preferred technique for a metal production tool is diamond turning. A thermoplastic tool can be replicated off a metal master tool. The master tool will have the inverse pattern desired for the production tool. The master tool can be made in the same manner as the metal production tool. The master tool is preferably made out of metal, e.g., copper and can be diamond turned. A nickel tool can then be replicated off of the diamond turned copper tool. The thermoplastic sheet material can be heated and optionally along with the metal tool such that the thermoplastic material is embossed with the master tool pattern by pressing the two together. The thermoplastic can also be extruded or cast onto the metal tool and then pressed. The thermoplastic material is cooled to solidify and produce the production tool. Examples of preferred thermoplastic production tool materials include polyester, polycarbonates, polyvinyl chloride, polypropylene, polyethylene and combinations thereof. If a thermoplastic production tool is utilized, then care must be taken not to generate excessive heat that may distort the thermoplastic production tool.

The production tool may also contain a release coating to permit easier release of the friction material or friction composites from the production tool. Examples of such release coatings for metals include hard carbide, nitride or boride coatings. Examples of release coatings for thermoplastics include silicones and fluorochemicals, which can be grafted into the polymer.

Figure 4:
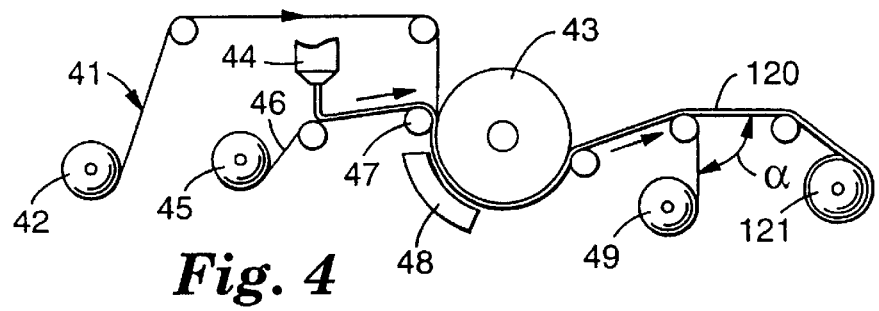
FIGS. 4–5 are schematics which illustrate methods of making friction materials illustrated in FIGS. 1–2.

One method to make the inventive friction materials of FIGS. 1 and 2 of the invention is illustrated in FIG. 4. Backing 41 leaves an unwind station 42 and at the same time the production tool 46 leaves an unwind station 45. Production tool 46 is coated with slurry by means of coating station 44. It is possible to heat the slurry or to use ultrasonic energy prior to coating to lower the viscosity. The coating station can be any conventional coating means such as a knife coater, a curtain coater, or a die coater. The preferred coating technique is a vacuum fluid bearing die. After the production tool is coated, the backing is brought into contact with the slurry coated tool by any means such that the slurry wets the front surface of the backing. In FIG. 4, the slurry is brought into contact with the backing by means of contact nip roll 47. Next, contact nip roll 47 also forces the resulting construction against support drum 43. During this step, an optional plastic film or release paper may be layered onto the backside of the backing (between support drum 43 and backing 41) in order to allow forcing of slurry into cavities of the production tool, and also to ensure that some of the slurry penetrates into the backing when nonwoven backings are employed. The slurry wets the front surface of the backing such that a portion of the slurry soaks at least through a portion of the thickness of the backing while the unimpregnating portion remains on the front surface as a coating contained between the front surface of the backing and the cavitated face of the production tool. This release layer can be peeled off before curing the binder precursor of the friction coating to impart texture thereto, or alternatively, this layer can be peeled off after cure but prior to using the friction material. Optionally, the backside of the backing can then be mechanically scuffed or roughened to provide improved bonding interface between the adhesive and the clutch plate or other member.

Next, some form of energy 48, e.g., actinic radiation such as ultraviolet, E-beam, and the like, is transmitted into the binder precursor slurry to at least partially cure the resin of the binder precursor slurry. The term "partial cure" means that the resin is polymerized to such a state that the slurry does not flow from an inverted test tube. Partial cure of the resin at the interface between the resin and the tooling is important to allow removal of the tooling. Partial cure is accomplished by adjusting the dosage and radiation, as is commonly done by one of skill in the art.

To ensure more complete and substantially full cure, the resin in the binder precursor slurry can be passed by the radiation energy source multiple times and/or by adjusting the dosage and voltage. Preferably, the tooling/friction material is flipped over at least once between these multiple passes to irradiate both surfaces and ensure complete irradiation. Also, as a finishing radiation exposure, after separating and removing the tooling, the friction material can be passed under the radiation source at least once more with the resulting frictional surface formed directly bombarded by the radiation energy.

One general scheme for effecting radiation cure of the friction material involves the steps of (1) passing the slurry-coated tooling/nonwoven backing/plastic film by an E-beam source operating at 300 Kev with the tooling backside nearest the E-beam source, and with about a 1 Mrad dosage imparted; (2) turning over the slurry-coated tooling/backing/plastic film and passing the stack by the E-beam source again except with the plastic film nearest the E-beam source and with a dosage of about a 2 megarad imparted, (3) removing the tooling to leave a shaped, at least partially cured layer of friction composites formed on a surface of the backing; (4) passing this resulting friction material by the E-beam source again with the friction composites nearest and facing the E-beam source and with about a 6 megarad dosage imparted; and (5) removing the plastic film from the back side of the backing to provide the formed friction material.

In any event, after separation from the friction material, the production tool is rewound on mandrel 49 so that the production tool can be reused again. Additionally, after radiation curing, the friction material 120 is wound on mandrel 121. If the resin in the binder precursor slurry is still not fully cured, the resin can then be fully cured by either ambient heat and/or exposure to another energy source, such as a thermal energy source.

The radiation energy can be transmitted through the production tool so long as the production tool does not appreciably absorb the radiation energy. Additionally, the radiation energy source should not appreciably degrade the production tool.

When the friction composites comprise carbon particles, it is preferred that the resin of the binder precursor slurry be cured by thermal energy or electron beam energy, and more preferably by election beam energy.

The binder precursor slurry can also be coated onto the backing and not into the cavities of the production tool. A plastic film may be used to allow hand or roll squeezing of slurry into the cavities, if necessary. The slurry coated backing is then brought into contact with the production tool such that the slurry flows into the cavities of the production tool. The remaining steps to make the friction material are the same as detailed above.

Figure 5:
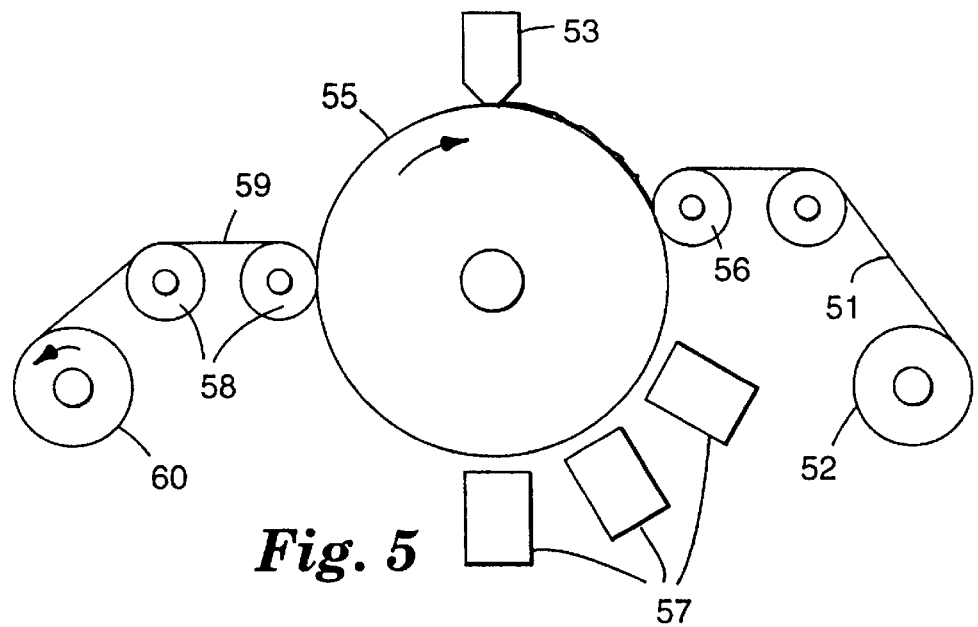

Another method is illustrated in FIG. 5. Backing 51 leaves an unwind station 52 and the binder precursor slurry 54 is coated into the cavities of the production tool 55 by means of the coating station 53. The binder precursor slurry can be coated onto the production tool by any technique such as a roll coater, a knife coater, a curtain coater, or a die coater. Again, it is possible to heat the binder precursor slurry or use ultrasonic energy to lower the viscosity. Then, the backing and the production tool containing the slurry are brought into contact by a nip roll 56 such that the slurry wets the front surface of the backing. Preferably, a portion of the slurry soaks at least through a portion of the thickness of the backing while the unimpregnating portion remains on the front surface as a coating contained between the front surface of the backing and the cavitated face of the production tool. Next, the resin in the binder precursor slurry is at least partially cured by exposure to an energy source 57. In this method, the radiation energy is transmitted though the backing. After this at least partial cure, the slurry is converted to a friction coating 59 having a plurality of precisely shaped friction composites that are bonded or adhered to the backing. As described in connection with FIG. 4 above, the friction material in this embodiment likewise can be subjected to multiple passes under the radiation energy source with the stack of layers again preferably reversed in orientation between passes to provide for radiation bombardment striking each side thereof. After completing curing, the resulting friction material is removed from the production tool by means of nip rolls 58 and wound onto a rewind station 60. In this method, the energy source can be thermal energy or radiation energy, although radiation energy is preferred.

As an alternative approach to this latter method, the binder precursor slurry can be first coated onto the front surface of the backing instead of the tooling cavities. The slurry coated backing is then brought into contact with the production tool such that the slurry wets into the cavities of the production tool. The remaining steps to make the friction material are the same as detailed above.

In any of the method variations using facilities such as depicted in FIGS. 4 and 5, it is preferred that the binder precursor slurry penetrate between the backing fibers in the instance of a fibrous backing. A plastic film may be temporarily laminated onto the back side of the fibrous backing to prevent binder precursor slurry from flowing completely through and out of the backing and then otherwise soiling the conveyor rolls and equipment. This plastic film is then removed from backing. This removal is effected preferably after the impregnating resin of the fibrous backing is partially cured to allow removal of the backside film without introducing voids to thus preserve the backside texture imparted thereby. As the film tends to leave the backside of the fibrous backing rather smooth in texture, and since the finished friction material is typically subsequently adhered to a substrate, such as a metal clutch plate member, it is usually desirable to mechanically scuff or roughen the back side of the friction material. This can be done on a laboratory scale using a hand held wire brush, cylinder brush, nonwoven abrasive, coated abrasive, or equivalent.

EXAMPLES

The following non-limiting examples will further illustrate the invention. All parts, percentages, ratios, etc., in the examples are by weight unless otherwise indicated. The following designations are used throughout the examples:

| | |
|---|---|
| TMPTA | trimethylol propane triacrylate, commercially available from Sartomer, Exton, PA under the trade designation "SARTOMER 351" |
| TATHEIC | triacrylate of tris(hydroxy ethyl)isocyanurate, commercially available from Sartomer, Exton, PA, under the trade designation "SARTOMER 368" |
| GUAM | glycoluril acrylamide made according to the teachings of U.S. Pat. No. 5,055,113 (Larson et al.), Preparation 5, except that it was made on a larger scale |
| AMP | acrylamidomethylated phenol made according to the teachings of U.S. Pat. No. 4,903,440 (Larson et al.), Preparation 4, except that it was made on a larger scale |
| DAP | phthalate acid diacrylate ester, made according to the teachings of U.S. patent application No. 08/334,817 (Thurber et al.) |
| NPGDA | neopentyl glycol diacrylate, commercially available from Sartomer under the trade designation "247 MONOMER" |
| PH2 | 2-benzyl-2-N,N-dimethylamino-1-(4-morpholinophenyl)-1-butanone, commercially available from Ciba Geigy Corp. under the trade designation "IRGACURE 369" |
| PH3 | alpha-dimethoxy-alpha-phenylacetophenone, commercially available from Ciba Geigy Corp. under the trade designation "IRGACURE 651" |
| FP1 | petroleum coke friction particle, 5% maximum retained on a 200 mesh screen, commercially available from Asbury Mills of New Jersey under the trade designation "4249" |
| FP2 | petroleum coke friction particle, 45% to 60% passes through a 200 mesh screen, commercially available from Asbury Mills of New Jersey under the trade designation "4349" |
| NPR | a nitrile phenolic resin commercially available from 3M, St. Paul, MN under the trade designation "AF15" |
| ASF | amorphous silica filler, commercially available from DeGussa, Dublin, OH, under the trade designation "OX-50" |
| SCA | a silane coupling agent, 3-methacryloxy-propyltrimethoxysilane, commercially available from Union Carbide under the trade designation "A-174" |
| SFL | silica flour, commercially available from U.S. Silica, Berkeley Springs, WV, under the trade designation "Sil-O-Sil" |
| URO | difunctional aliphatic urethane acrylate oligomer blended with 25% isoborynl acrylate, commercially available from Sartomer, Exton, PA, under the trade designation "CN966J75" |
| NRP | nitrile rubber particles, 100 mesh, commercially available from Midwest Elastomers, Inc., Wapakoneta, OH |
| EBC | silicone ester acrylate oligomer, commercially available from UCB Chemical, Smyrna, GA, under the trade designation "Ebecryl 350" |
| V52 | 2,2-Azobis, commercially available from DuPont, Wilmington, DE, under the trade designation "Vazo 52" |
| FLE | fluoroelastomer polymer, commercially available from Dyneon, LLC, St Paul, MN, under the trade designation "FC-2144" |
| FP3 | thermal black carbon, commercially available from Huber, Akron, OH, under the trade designation "Huber N990" |
| CAH | calcium hydroxide |
| MGO | magnesium oxide |
| CWX | carnuba wax |

Examples 1–3 and Comparative Example A

Examples 1–3 and Comparative Example A illustrate one embodiment of the friction material of the invention, including a plurality of precisely shaped composites.

Procedure for Making the Friction Material 1

A binder precursor slurry was prepared by mixing the desired resin precursors together and then adding the desired friction particles gradually to make a homogeneous slurry. The resulting binder precursor slurry was coated onto a production tool. The production tool was a polypropylene thermoplastic and was replicated off of a nickel based metal production tool. The pattern of the production tool was such that the resulting friction composites formed from the process described in the examples herein were each shaped as a 356 micrometers high, flat topped pyramid with four exposed side facets extending at an acute angle from a square-shaped base to the flat top. The flat tops each had a side length of 316 micrometers, and the side facets had 442 micrometers side lengths at their intersection with the base. At their respective bases, the friction composites were spaced apart 152 micrometers.

This binder precursor slurry-coated production tool was placed into contact with a nonwoven backing and a roller was pressed over the production tool to force the slurry into the cavities of the production tool. The nonwoven backing was an aramid fiber-based nonwoven backing, having a mean weight of 13.6 grams/m$^2$ and a mean thickness of 132.1 micrometers, commercially available from Veratec, a division of International Paper, Tuxedo, N.Y. under the trade designation "KEVLAR 29" sheet and Veratec grade "8000054". Next, the coated intermediate friction article/tooling stack was cured by irradiation with a 300 KeV electron beam by multiple passes at different dosages of radiation, as described in greater detail hereinafter. In general, the friction material was sequentially irradiated from both sides of the friction material/tooling stack, then removed from the tool, after which the friction material was once again passed under the same electron beam. The coating weight (i.e., add-on after drying and separation of tooling) of the slurry on the nonwoven backing was approximately 540 grams/m$^2$.

Test Procedure 1

Friction materials were tested on a Society of Automotive Engineers (SAE) No. 2 Friction Test Machine with clutch plate head assembly (available from Greening Associates, Inc., Detroit, Mich.), in accordance with General Motors Corporation test number GM-6297M, Appendix C (1993). In this standard test of friction materials and transmission fluids, a 100 hour continuous test was performed and torque plotted versus time. The midpoint torque (a 48-point average centered about a point in time halfway between the start of engagement and the lockup scan), maximum torque (largest torque value found between 500 rpm and the lockup scan), delta torque (maximum torque—midpoint torque), and engagement time were determined. The transmission fluid utilized in the testing was that known under the trade designation "DEXRON III", available from GM.

The friction material for Examples 1 and 2 was made according to General Procedure For Making the Friction Material. For Examples 1 and 2, a binder precursor slurry was prepared by mixing 123.8 parts TATHEIC, 123.8 parts TMPTA, 2.5 parts PH2, 93.6 parts FP1, 200 parts FP2, 28.7 parts ASF, and 2.5 parts SCA into a homogeneous slurry. The resulting binder precursor slurry was degassed to 63.5 cm of mercury, while heating to 60° C. The slurry was coated into the production tool by means of a bull nose knife coater and was adjusted to provide a 51 micrometer gap over the plastic tooling. This knifing at the 51 micrometer gap was repeated five times with fresh slurry applied upon each pass. This procedure was conducted to reduce air bubble entrapments in the slurry coated cavities of the tooling. Then, additional slurry was applied to the exposed surface of the slurry in the tool cavities with a 254 micrometer gap. This additional slurry resin was applied for the purpose of helping to ensure that the backing would be saturated by the slurry resin, when later brought into contact with the coated tooling.

For Examples 1 and 2, the backing was forced into contact with the slurry-coated side of the tooling by a nip roll immediately before the irradiation treatment, such as in a scheme as shown in FIG. 4. During this step of contacting the backing and slurry-coated tooling, a thin plastic film was placed on the backside of the backing opposite the side facing the tooling. This process provided good replication and significantly reduced the voids. The resulting intermediate sample was then irradiated through the tooling (from the tooling side) and into the friction slurry with an electron beam operating at 300 KeV and 1 Mrad dosage.

Then, the intermediate sample was turned over and again irradiated by the E-beam source again except with the plastic film nearest the E-beam source and with a dosage of about a 2 megarad imparted. Then, the tooling and plastic film was removed to leave a shaped, at least partially cured layer of friction composites formed on a surface of the backing. This resulting friction material was then passed by the E-beam source with the friction composites nearest and facing the E-beam source and with about a 6 megarad dosage imparted.

The friction material for Example 3 was made according to General Procedure For Making the Friction Material. A binder precursor slurry was prepared by mixing 98.5 parts GUAM, 24.5 parts AMP, 74.0 parts DAP, 49.25 parts NPGDA, 3.75 parts PH3, 93.6 parts FP1, 200.0 parts FP2, 28.7 parts ASF, and 2.5 parts SCA into a homogeneous slurry. The resulting binder precursor slurry was degassed to 63.5 cm of mercury while heating to 80° C. The slurry was coated into the production tool by means of a knife coater that was adjusted to provide a 51 micrometer gap over the plastic tooling. The coating under the 51 micrometer knife gap was repeated five to ten times with fresh slurry applied upon each pass. This procedure was conducted to reduce air bubble entrapments in the slurry coated cavities of the tooling. Then, an additional slurry thickness was applied to the exposed surface of the slurry in the tool cavities with a 254 micrometer knife gap. This additional slurry resin thickness will saturate the backing when it is brought into contact with the coated tooling.

For Example 3, the backing, was forced into contact with the slurry-coated side of the tooling by a nip roll immediately before the irradiation treatment, similar to the scheme shown in FIG. 4. While contacting the backing and slurry-coated tooling, a thin release paper was placed on the backside of the backing opposite the side facing the tooling. This release paper significantly reduced voids while preventing the resin slurry from squeezing onto the nip rollers and E-Beam surfaces. The resulting intermediate sample was attached to a web running through the E-Beam at 25 feet per minute such that the beam was radiating through the release paper, the saturated backing, the resin slurry, and the plastic tooling, respectively. For the first pass, the beam was operated at 275 KeV and 5 Mrad dosage. On the second pass, the 5 Mrad dosage was applied, except that the sample was placed on the web such that the beam was radiating through the plastic tooling, the resin slurry, the saturated backing, and the release paper, respectively. On the third pass, the release paper was removed and a 3 Mrad dosage was applied through the backing. Then, the tooling was removed to leave a shaped, at least partially cured layer of friction composites formed on the surface of the backing. To ensure complete curing, the sample of Example 3 was placed in an oven at 177° C. for 3 hours.

After the friction material for each of Examples 1–3 was prepared, portions of it were bonded to both faces of individual steel plates commercially available from General Motors Corporation under the part number 8643741 using NPR. The faces of the steel plates were prepared for receipt of the friction materials tested herein by sandblasting off previously installed friction materials oh the plates, and then the steel plates were primed on both faces with a 3M EC-2174 nitrile phenolic liquid primer, available from 3M, St. Paul, Minn. The primed plates were dried at 25° C. for one hour, then partially cured at 150° C. for one hour. The resulting plate samples were then heated for one hour at 177° C. under a force of 6360 kg to cure the NPR.

The friction material was bonded to the primed plates via a composite adhesive layer having the following construction. For the adhesive layer, there was provided a construction involving tacking two separate nitrile phenolic films, viz., nitrile phenolic films made with 3M EC-2174, available from 3M, St. Paul, Minn., onto the opposing faces of a carbon-filled phenolic saturated paper as an intervening layer. The aramid fiber paper was performed by selection and saturation with a mixture of phenolic resin and carbon per the description, coating formulation and process described in Example 1 of U.S. Pat. No. 5,083,650 (Seitz et al.), with the proviso that the first and second resin coatings were sequentially applied to the aramid paper without depositing any granular carbon particles to the outer surface of the saturated paper in-between the first and second coating applications, unlike Example 1 of U.S. Pat. No. 5,083,650. Rings of the adhesive film/phenolic saturated adhesive film composite were cut out, as were complementary sized rings of the Examples 1–3 friction material. This stack of friction material/composite adhesive layer/primer/steel plate/primer/composite adhesive layer/friction material was lightly tacked together with the application of heat from an iron set at "linen". The stack was then pressed in a heated hydraulic press for one hour at 177° C.

The friction material of Comparative Example A comprised phenolic saturated friction paper commercially available as the standard friction paper bonded on part number 8643741 as obtainable from General Motors Corporation.

The friction material of Examples 1–3 and Comparative Example A were then tested according to the Test Procedure above and the results can be found in Table 1. The results indicated in Table 1 were measured at the one hour and 100 hour test points during the tests. Upon examination of the steel plates for Examples 1–3 after each test, it was determined that the friction material did not catastrophically fail (i.e., it did not delaminate from the plate); and the friction material generally retained its original microtopography with minor wear. Therefore, it was demonstrated that the friction material of the invention represented a workable product and viable alternative to conventional friction materials.

TABLE 1

| Measurement | Comp. Ex. A | Example 1 | Example 2 | Example 3 |
|---|---|---|---|---|
| Test Points (hrs) | 1/100 | 1/100 | 1/100 | 1/100 |
| Cycles per Hour | 180/180 | 180/180 | 180/180 | 180/180 |
| Midpoint Dynamic | 154/167 | 140/130 | 149/136 | 146/106 |

TABLE 1-continued

| Measurement | Comp. Ex. A | Example 1 | Example 2 | Example 3 |
|---|---|---|---|---|
| Torque (N-m) | | | | |
| Delta[1] Torque (N-m) | 5/4 | 30/69 | 21/43 | 16/68 |
| Maximum Torque (N-m) | 159/171 | 170/199 | 170/179 | 162/174 |
| Engagement Time (sec) | 0.580/0.539 | 0.615/0.651 | 0.588/0.635 | 0.609/0.771 |

[1]Delta Torque = Maximum-Midpoint Torque Values

Examples 4–10 and Comparative Example B

Examples 4–10 illustrate other embodiments of the invention.

General Procedure for Making Friction Material 2

The slurry was coated into the production tooling using a vacuum-slot-die. As the tooling passes under the die face, the vacuum slot removes air from the tooling cavities while the slurry slot delivers the precursor slurry that fills the evacuated cavities. The die was assembled with an 8 mil offset between the vacuum and slurry slot such that the vacuum slot was closer to the tooling and the slurry slot could deliver an additional 10 mil film needed to saturate the nonwoven backing. The vacuum slot was positioned 2 to 3 mils above the tooling. The coated film thickness was adjusted by a combination of web speed and slurry pump speed. Vacuum was supplied by a vacuum pump run at 27 inches Hg.

This binder precursor slurry-coated production tool was placed into contact with a nonwoven backing (as described under General Procedure for Making Friction Material 1) and release liner. The stack of release liner, nonwoven, and coated tooling was run between two rollers to press the excess slurry into the nonwoven backing. The coated intermediate friction article/tooling stack was cured by irradiation with either a 300 KeV electron beam by multiple passes at different dosages of radiation or by Ultraviolet (UV) light by multiple passes, as described in greater detail hereafter. In general, the friction material was sequentially irradiated from both sides of the release liner/friction material/tooling stack, then removed from the tool, after which the friction material was once again passed under the same electron beam or, in the case of UV cured material, placed into an oven.

Test Procedure 2

Friction materials were tested on a Society of Automotive Engineers (SAE) No. 2 Friction Test Machine with clutch plate head assembly (available from Greening Associates, Inc., Detroit, Mich.), in accordance with a proposed SAE low speed step level test method and terms defined in SAE J1646. In this standard test of wet friction materials, a clutch pack was formed by placing each of the friction disks to be tested between steel reaction disks in the dynanometer. The friction disks were attached to a rotating shaft while the steel reaction disks were fixed and instrumented with torque sensors. The entire clutch pack was supplied with transmission oil during the test.

Each lockup cycle began with bringing the friction disks, attached shaft, and inertial mass to a rotational speed of 3600 rpm. A piston applied pressure to the clutch pack which caused the friction disks to make contact with the reaction disks. The lockup cycle was completed when the shaft stops rotating. The lockup time was the time required for the friction disks to stop rotating, measured from the time when the piston apply pressure reached a 30 kPa threshold. The oil temperature, lockup time, and initial RPM were held constant while apply pressure and torque varied. The required apply pressure and measured torque were used to compute the coefficient during the lockup. Each energy level was run for 200 lockup cycles. The initial energy level was set at 15.13 kJ, and was incremented with 2.89 kJ step increases until the friction material failed or completed the eleventh energy step of 44.40 kJ. Each step in energy was achieved by increasing the inertial mass on the dynamometer's rotating shaft. The transmission fluid utilized in the testing was that known under the trade designation "DEXRON III", available from GM.

The variables of interest were the coefficients of friction at the initial, the midpoint and the endpoint of the lockup cycle, and the energy level at which the material failed. Material failure occurred when the dynamometer apply pressure cannot maintain the 0.5 second lockup.

When evaluating friction materials, it is desirable to have the coefficients of friction as high as possible, but the endpoint coefficient of friction should be less than or equal to the midpoint coefficient of friction. This provides an indication of the relative smoothness of a clutch shifting characteristic wherein the clutch includes the friction material tested.

The binder precursor slurries for Examples 4–10 were prepared based on the following formulations shown in Table 2. Comparative example B was a conventional clutch ring, commercially available under the trade designation E8DZ-7B164-A, from Ford Motor Company, Dearborn, Mich.

pared for bonding of the friction materials. The existing paper on the commercial disks was removed by soaking in a caustic soak. The disks were rinsed with water and allowed to air dry. Both faces were primed with 3M EC-2174 nitrile phenolic liquid primer, available from 3M, St. Paul, Minn. The primed plates were dried at 25° C. for one hour, then partially cured at 204° C. for one hour.

The friction material was bonded to the primed disks via a composite adhesive layer having the following construction. For the adhesive layer, there was provided a construction involving tacking two separate nitrile phenolic films, viz., nitrile phenolic films made with MacTac, onto opposing faces of a carbon-filled phenolic saturated aramid paper as an intervening layer. The aramid fiber paper was formed by selection and saturation with a mixture of phenolic resin and carbon per the description, coating formulation and process described in Example 1 of U.S. Pat. No. 5,083,650 (Seitz et al.), with the proviso that the first and second resin coatings were sequentially applied to the aramid paper without depositing any granular carbon particle to the outer surface of the saturated paper in-between the first and second coating applications, unlike Example 1 of U.S. Pat. No. 5,083,650. Rings of the adhesive film/phenolic saturated adhesive film composite were cut out, as were complementary sized rings of Example 4 and 5 friction material. This stack of friction material/composite adhesive layer/steel plate/composite adhesive layer/friction material was lightly tacked together with application of heat from an iron set at "linen". The stack was then pressed in a heated hydraulic press for two minutes at 5000 lbs. and 204° C.

Examples 6 and 7

The friction material for Examples 6 and 7 was made identical to that of Comparative examples 4 and 5. However,

TABLE 2

| Resin Precursor | Example | | | | | | |
|---|---|---|---|---|---|---|---|
| | 4 | 5 | 6 | 7 | 8 | 9 | 10 |
| TATHEIC | 2475.0 | 2475.0 | 2475.0 | 2475.0 | 1104.9 | 567.0 | 982.0 |
| TMPTA | 2457.0 | 2457.0 | 2475.0 | 2475.0 | 1104.9 | 850.5 | 982.0 |
| PH2 | 50.0 | 50.0 | 50.0 | 50.0 | 22.2 | 45.0 | 40.0 |
| FP1 | 1873.6 | 1873.6 | 1873.6 | 1873.6 | 931.5 | | |
| FP2 | 4000.0 | 4000.0 | 4000.0 | 4000.0 | | 936.0 | 800.0 |
| ASF | 574.8 | 574.8 | 574.8 | 574.8 | | | |
| SCA | 46.0 | 46.0 | 46.0 | 46.0 | 22.5 | 22.5 | 16.0 |
| SFL | | | | | 1314.0 | 1314.0 | 780.0 |
| EBC | | | | | 67.5 | | 60.0 |
| URO | | | | | | 765.0 | |
| V52 | | | | | | 21.8 | 9.8 |
| NRP | | | | | | | 400.0 |

Examples 4 and 5

The friction material for Examples 4 and 5 was made with a binder precursor slurry prepared by mixing 2475.0 parts TATHEIC, 2475.0 parts TMPTA, 50.0 parts PH2, 1873.6 parts FP1, 4000.0 parts FP2, 574.8 parts ASF, and 46.0 parts SCA into a homogeneous slurry. The slurry was then heated to 60° C. and coated as described in General Procedure for Making Friction Material 2. The resulting coating was radiated (with release liner facing up) with an electron beam operating at 300 Kev and 6 Mrad dosage. The coating was turned over with the tooling facing up and passed through at 300 Kev and 2 Mrad dosage. The set material was removed from the tooling to leave at least a partially cured layer of friction composites formed on the surface of the backing. The friction material received another dosage of 7 Mrad at 300 Kev for a final cure.

The steel disks, commercially available from Ford Motor Company under part number E8DZ-7B164-A, were prethe composite adhesive layer used in Comparative examples 4 and 5 was replaced with a fluoroelastomer layer. In this case, the fluoroelastomer layer consisted of 100.0 parts FLE, 30.0 parts FP3, 6.0 parts CAH, 3.0 parts MGO, and 0.5 parts CWX, compounded and calendared into sheets approximately 18 mils (0.46 mm) thick.

The friction disk stack for Examples 6 and 7 were formed by first placing a layer of the compounded fluoroelastomer on both sides of the steel disk and the friction surface layers on top of the fluoroelastomer layers. Prior to forming the stack, the bare steel disks were primed with 5:1 mixture of Isopropyl Alcohol and Chemlok 5150, available from Lord Corp., Erie, Pa. After forming the stack, the layers were tacked together with a hot iron. The uncompressed overall caliper was measured, and shims were chosen to limit the press gap to approximately 7 mils compression of the friction material. The shims and disks were placed into a press heated to 400° F. and pressed with 5000 lbs for two minutes to cure the fluoroelastomer. The excess fluoroelastomer was trimmed from the inner and outer diameters to complete the preparation.

Example 8

The friction material for Example 8 was prepared using a different binder precursor formulation that was cured with UV lights. The UV binder precursor slurry was prepared by mixing 1104.9 parts TATHEIC, 1104.9 parts TMPTA, 22.2 parts PH2, 931.5 parts FP2, 1314.0 parts SFL, 22.5 parts SCA, and 67.5 parts EBC into a homogeneous slurry. The slurry was coated with the vacuum-slot-die process described under General Procedure for Making the Friction Material 2. The coated material was passed under two 600 W/in. D-bulbs in series at a web speed of 20 ft./min. Since the dark mineral limited cure penetration, two passes under the lights were required. The first pass illuminated and partially cured the topography through the polypropylene tooling. On the second pass, the lights illuminated the backing to partially cure it. The partially cured friction material was stripped from the tooling and placed into an oven at 176° F. for six hours to complete the cure.

The clutch rings were bonded to the steel plates using fluoroelastomer with the procedure described under Examples 6 and 7.

Example 9

The friction material of Example 9 was coated with the vacuum-slot-die process as described under General Procedure for Making the Friction Material 2 and cured with UV lights as described under Example 8. However, a different binder precursor slurry was used. The UV binder precursor slurry was prepared by mixing 567.0 parts TATHEIC, 850.5 parts TMPTA, 765.0 parts URO, 45.0 parts PH2, 936.0 parts FP2, 1314.0 parts SFL, 22.5 parts SCA, and 21.8 parts V52 into a homogeneous slurry. The URO additive adds flexibility and compliability to the cured product eliminating the need for the fluoroelastomer sublayer. The V52 augments the cure by utilizing the thermal energy from the UV lamps and the exotherm from the photo-initiated crosslinking, eliminating the post oven cure used in Example 8.

Example 9 friction material was bonded directly to the steel friction disks. Both friction disk faces were primed with 3M EC-2174 nitrile phenolic liquid primer, available from 3M, St. Paul, Minn. The primed plates were dried at 25° C. for one hour, then partially cured at 204° C. for one hour. The friction material was bonded to the primed disks via adhesive layer, formed by tacking two layers of nitrile phenolic films, viz., nitrile phenolic films made with MacTac, between each steel disk face and the friction material films. The overall uncompressed caliper was measured, and shims were selected to limit the press gap to 3 mils compression of the friction material. The shims and disks were placed into a press heated to 204° C. and pressed with 5000 lbs. for two minutes to complete the preparation.

Example 10

The friction material of Example 10 was coated with the vacuum-slot-die process as described under General Procedure for Making the Friction Material 2 and cured with UV lights as described under Example 8. However, a different binder precursor slurry was used. The UV binder precursor slurry was prepared by mixing 982.0 parts TATHEIC, 982.0 parts TMPTA, 40.0 parts PH2, 800.0 parts FP2, 780.0 parts SFL, 400.0 parts NRP, 16.0 parts SCA, 60 parts EBC, and 9.8 parts V52 into a homogeneous slurry. The NRP additive adds flexibility and compliability to the cured product eliminating the need for the fluoroelastomer sublayer and the V52 eliminated the need for the post oven cure used in Example 8.

Example 10 friction material was directly bonded to the steel friction disks using the bonding procedure of Example 9.

Each of the friction materials in the Examples above were evaluated using the procedure described in Test Procedure 2. The following table summarizes the dynamometer results. The initial ($\mu$I), midpoint ($\mu$m), and end ($\mu$e) coefficients of friction are calculated from the measured torque and apply pressures in accordance with SAE J1646. The results from the friction materials of Comparative example B and Examples 4, 5 and 6 are shown in Table 3a and the results from the friction materials in Examples 7, 8, 9 and 10 are shown in Table 3b. The energy level (in kJ) is shown in the left column, with the "An" designating the eleven energy levels, as described above. The maximum durability (initial ($\mu$I), midpoint ($\mu$m), and end point ($\mu$e) coefficients of friction) are shown for each friction material at the highest energy level completed which is either prior to material failure or test completion.

TABLE 3a

| Energy Level | Comparative Ex. B | | | Example 4 | | | Example 5 | | | Example 6 | | |
|---|---|---|---|---|---|---|---|---|---|---|---|---|
| (kJ) | $\mu$I | $\mu$m | $\mu$e | $\mu$I | $\mu$m | $\mu$e | $\mu$I | $\mu$m | $\mu$e | $\mu$I | $\mu$m | $\mu$e |
| A1  15.13 | 0.172 | 0.163 | 0.157 | 0.120 | 0.131 | 0.129 | 0.113 | 0.123 | 0.133 | 0.126 | 0.163 | 0.151 |
| A2  18.02 | 0.160 | 0.152 | 0.147 | 0.108 | 0.120 | 0.130 | 0.105 | 0.116 | 0.134 | 0.126 | 0.148 | 0.146 |
| A3  20.91 | 0.151 | 0.148 | 0.147 | 0.098 | 0.109 | 0.131 | 0.099 | 0.116 | 0.133 | 0.123 | 0.147 | 0.146 |
| A4  23.80 | 0.151 | 0.147 | 0.143 | 0.066 | 0.102 | 0.124 | 0.090 | 0.114 | 0.129 | 0.132 | 0.151 | 0.141 |
| A5  26.62 | 0.141 | 0.142 | 0.140 | | | | 0.087 | 0.104 | 0.129 | 0.115 | 0.136 | 0.146 |
| A6  29.58 | 0.136 | 0.138 | 0.133 | | | | | | | 0.119 | 0.139 | 0.144 |
| A7  32.47 | 0.130 | 0.134 | 0.130 | | | | | | | 0.105 | 0.133 | 0.141 |
| A8  35.36 | | | | | | | | | | 0.091 | 0.126 | 0.139 |
| A9  38.25 | | | | | | | | | | 0.093 | 0.126 | 0.139 |
| A10 41.15 | | | | | | | | | | 0.090 | 0.123 | 0.130 |
| A11 44.04 | | | | | | | | | | 0.097 | 0.125 | 0.126 |

| Energy Level | Example 7 | | | Example 8 | | | Example 9 | | | Example 10 | | |
|---|---|---|---|---|---|---|---|---|---|---|---|---|
| (kJ) | $\mu$I | $\mu$m | $\mu$e | $\mu$I | $\mu$m | $\mu$e | $\mu$I | $\mu$m | $\mu$e | $\mu$I | $\mu$m | $\mu$e |
| A1  15.13 | 0.110 | 0.173 | 0.165 | 0.139 | 0.145 | 0.144 | 0.172 | 0.196 | 0.193 | 0.171 | 0.172 | 0.169 |

TABLE 3a-continued

| | | | | | | | | | | | | | |
|---|---|---|---|---|---|---|---|---|---|---|---|---|---|
| A2  | 18.02 | 0.103 | 0.181 | 0.170 | 0.133 | 0.142 | 0.142 | 0.157 | 0.185 | 0.176 | 0.162 | 0.167 | 0.160 |
| A3  | 20.91 | 0.108 | 0.177 | 0.168 | 0.134 | 0.143 | 0.141 | 0.153 | 0.177 | 0.169 | 0.158 | 0.164 | 0.160 |
| A4  | 23.80 | n/r | n/r | n/r | 0.131 | 0.145 | 0.140 | 0.147 | 0.162 | 0.159 | 0.149 | 0.155 | 0.153 |
| A5  | 26.62 | 0.107 | 0.167 | 0.159 | 0.130 | 0.150 | 0.149 | 0.141 | 0.154 | 0.151 | 0.148 | 0.153 | 0.149 |
| A6  | 29.58 | 0.107 | 0.170 | 0.161 | 0.127 | 0.139 | 0.136 | 0.135 | 0.143 | 0.144 | 0.134 | 0.140 | 0.146 |
| A7  | 32.47 | 0.095 | 0.168 | 0.158 | 0.125 | 0.138 | 0.134 | 0.130 | 0.135 | 0.137 | 0.124 | 0.128 | 0.139 |
| A8  | 35.36 | 0.096 | 0.166 | 0.152 | 0.124 | 0.135 | 0.130 | n/r | n/r | n/r | 0.117 | 0.122 | 0.133 |
| A9  | 38.25 | 0.102 | 0.159 | 0.144 | 0.125 | 0.134 | 0.131 | 0.060 | 0.064 | 0.068 | 0.114 | 0.118 | 0.125 |
| A10 | 41.15 | 0.091 | 0.157 | 0.145 | 0.125 | 0.133 | 0.128 | | | | 0.114 | 0.118 | 0.123 |
| A11 | 44.04 | 0.089 | 0.140 | 0.131 | 0.120 | 0.126 | 0.122 | | | | 0.078 | 0.085 | 0.089 |

As shown in Tables 3a and 3b, Comparative Example B contained a commercial paper material that is used as a control. It was noted that the endpoint ($\mu e$) coefficient of friction is less than the midpoint ($\mu m$) coefficient of friction over the entire duration of the test, indicating good shifting characteristics throughout the test.

Examples 4 and 5 demonstrated the effect of friction material with low flexibility. In Examples 4 and 5, the elastic modulus is approximately $1.35 \times 10^8$ dyness/cm². As shown in Table 3a, the friction materials in these examples demonstrated shorter duration, as compared to Examples 6–10.

Examples 6–8 included a tie layer formed from a composition including a fluoroelastomer. Although Examples 6 and 8 did not exhibit coefficients of friction which matched Comparative Example B, they did exhibit good durability because they did not fail prior to completion of the test. Example 7 demonstrated a good coefficient of friction and durability. Further, Examples 6–8 all showed favorable shifting characteristics by comparing endpoint ($\mu e$) coefficient of friction and midpoint ($\mu m$) coefficient of friction.

Example 9 demonstrated an improved coefficient of friction. It is believed that the binder was more resilient or compliant because it was formed from a mixture which included at least one resin having at least one pendant acrylate group selected from the group of a urethane acrylate, isobornyl acrylate, a silicone acrylate and mixtures thereof. While the friction material of Example 9 did not exceed the durability of the friction materials of Examples 6–8, it did exceed that of Comparative Example B. Comparison of endpoint ($\mu e$) coefficient of friction and midpoint ($\mu m$) coefficient of friction showed favorable shifting characteristics.

Example 10 also demonstrated an improved coefficient of friction up to the midpoint of the test. It is believed that the material was more resilient or compliant because it was formed from a mixture which included nitrile rubber particles. The durability exceeded that of Comparative Example B, but showed less favorable shifting characteristics over the second half of the test.

The complete disclosures of all patents, patent applications, and publications are incorporated herein by reference as if individually incorporated. Various modifications and alterations of this invention will become apparent to those skilled in the art without departing from the scope and spirit of this invention, and it should be understood that this invention is not to be unduly limited to the illustrative embodiments set forth herein.

What is claimed:

1. A friction member comprising:
a layer of material fixed to a backing, the layer of material comprising a friction surface having at least 120 precisely shaped friction composites per square centimeter, each of the precisely shaped friction composites having a cross-sectional or three dimensional shape selected from the group consisting of parallelepipeds, rectangles, cones, truncated pyramids, semicircles, circles, triangles, squares, hexagons, pyramids, octagons, and combinations thereof, wherein each of the precisely shaped friction composites further has precisely the same shape as that of a cavity on a forming tool, where each precisely shaped friction composite comprises friction particles dispersed in a binder,
wherein the friction member is operatively adapted to form a portion of an apparatus for transmitting torque between two elements of a vehicle, where the apparatus is a component of the vehicle, the two elements are (i) two rotatable elements or (ii) a non-rotatable element and a rotatable element, and the friction member is operatively adapted to form a part of one of the elements that contacts and transmits torque therebetween, wherein the apparatus is selected from the group consisting of clutches, brakes, transmissions, synchronizer rings, and train tracks.

2. The friction member of claim 1, wherein the friction member exhibits an elastic modulus of about $10^6$ dynes/cm² to about $10^7$ dynes/cm².

3. The friction member of claim 1, wherein the friction surface comprises about 120 to about 1150 precisely shaped friction composites per square centimeter.

4. The friction member of claim 1, wherein the binder is prepared from a binder precursor that is radiation curable.

5. The friction member of claim 1, wherein the friction particles are carbon particles selected from the group consisting of coke, carbon black, graphite and combinations thereof.

6. The friction member of claim 1, wherein the layer of material further comprises a continuous land layer extending beneath and between the friction composites.

7. An apparatus for transmitting torque comprising:
two elements operatively adapted for contacting and transmitting torque therebetween, the elements being (i) two rotatable elements or (ii) a non-rotatable element and a rotatable element;
a substrate forming part of one of the elements; and
a friction member comprising a layer of material fixed to the substrate, the layer of material comprising a friction surface having at least 120 precisely shaped friction composites per square centimeter, each of the precisely shaped friction composites having a cross-sectional or three dimensional shape selected from the group consisting of parallelepipeds, rectangles, cones, truncated pyramids, semicircles, circles, triangles, squares, hexagons, pyramids, octagons, and combinations thereof, wherein each of the precisely shaped friction composites further has precisely the same shape as that of a cavity on a forming tool, where each precisely shaped friction composite comprises friction particles dispersed in a binder;

wherein the friction member forms a part of one of the elements that contacts the other of the elements to transmit torque therebetween.

8. The apparatus of claim 7, wherein the friction member exhibits an elastic modulus of about $10^6$ dynes/cm$^2$ to about $10^7$ dynes/cm$^2$.

9. The apparatus of claim 7, wherein the friction surface comprises about 120 to about 1150 precisely shaped friction composites per square centimeter.

10. The apparatus of claim 7, wherein the binder is prepared from a binder precursor that is radiation curable.

11. The apparatus of claim 7, wherein the friction particles are carbon particles selected from the group consisting of coke, carbon black, graphite and combinations thereof.

12. The apparatus of claim 7, wherein the apparatus is a clutch and the substrate is a clutch plate.

13. The apparatus of claim 7, wherein the apparatus is a brake and the substrate is a brake pad.

14. The apparatus of claim 7, wherein the substrate is a synchronizer ring.

15. The apparatus of claim 7, wherein the apparatus is a transmission and the substrate is a torque converter.

16. The friction member of claim 7, wherein the layer of material further comprises a continuous land layer extending beneath and between the friction composites.

17. The apparatus of claim 7, wherein the layer of material is fixed to a backing, and wherein the backing is bonded to the substrate.

18. An apparatus for transmitting torque, comprising:
a first plate member having a major surface;
a second plate member having a mating surface and positioned adjacent to the major surface of the first plate member;
a backing;
a friction member comprising a layer of material fixed to the backing, the layer of material comprising a friction surface defined by a plurality of precisely shaped friction composites, each of the precisely shaped friction composites having a cross-sectional or three dimensional shape selected from the group consisting of parallelepipeds, rectangles, cones, truncated pyramids, semicircles, circles, triangles, squares, hexagons, pyramids, octagons, and combinations thereof, wherein each of the precisely shaped friction composites further has precisely the same shape as that of a cavity on a forming tool, where each precisely shaped friction composite comprises friction particles dispersed in a binder, with the backing being interposed between the major surface of the first plate member and the layer of material and the friction member being interposed between the major surface of the first plate member and the mating surface of the second plate member; and
a rotating member capable of rotating the first plate member or the second plate member,
wherein the friction member is interposed between the first plate member and the second plate member so that the first plate member and the second plate member are able to transmit torque between the major surface and the mating surface.

19. The apparatus of claim 18, wherein the friction member exhibits a midpoint dynamic torque in the range of about 150 Newton-meters to about 180 Newton-meters.

20. The friction member of claim 18, wherein the apparatus is selected from the group consisting of clutches, brakes, transmissions and synchronizer rings.

21. The friction member of claim 18, wherein the layer of material further comprises a continuous land layer extending beneath and between the friction composites.

22. A method of transmitting power in a vehicle, comprising:
providing a friction member on a surface of a substrate forming part of a vehicle, the friction member comprising a layer of material fixed to a backing, the layer of material comprising a friction surface having at least 120 precisely shaped friction composites per square centimeter, each of said precisely shaped friction composites having a cross-sectional or three dimensional shape selected from the group consisting of parallelepipeds, rectangles, cones, truncated pyramids, semicircles, circles, triangles, squares, hexagons, pyramids, octagons, and combinations thereof, wherein each of the precisely shaped friction composites further has precisely the same shape as that of a cavity on a forming tool, where each precisely shaped friction composite comprises friction particles dispersed in a binder; and
transmitting torque with the friction member to an adjacent element of the vehicle.

23. A friction member comprising:
a layer of material fixed to a backing, the layer of material comprising a friction surface having at least 120 precisely shaped friction composites per square centimeter, each of said precisely shaped friction composites having a cross-sectional or three dimensional shape selected from the group consisting of parallelepipeds, rectangles, cones, truncated pyramids, semicircles, circles, triangles, squares, hexagons, pyramids, octagons, and combinations thereof, wherein each of the precisely shaped friction composites further has precisely the same shape as that of a cavity on a forming tool, where each precisely shaped friction composite comprises friction particles dispersed in a binder, wherein the layer of material defines a portion of an apparatus selected from the group consisting of clutches, brakes, transmissions, synchronizer rings, and train tracks.

24. The friction member of claim 23, wherein the layer of material further comprises a continuous land layer extending beneath and between the friction composites.

25. A friction member adapted to form a portion of an apparatus for transmitting torque, wherein the apparatus is selected from the group consisting of clutches, brakes, transmissions, synchronizer rings, and train tracks, the friction member comprising:
a layer of material fixed to a backing, the layer of material comprising a friction surface having at least 120 composites per square centimeter, each having a cross-sectional or three dimensional shape selected from the group consisting of parallelepipeds, rectangles, cones, truncated pyramids, semicircles, circles, triangles, squares, hexagons, pyramids, octagons, and combinations thereof, where each composite comprises friction particles dispersed in a binder.

26. The friction member of claim 25, wherein the friction member exhibits an elastic modulus of about $10^6$ dynes/cm$^2$ to about $10^7$ dynes/cm$^2$.

27. The friction member of claim 25, wherein the friction surface comprises about 120 to about 1150 friction composites per square centimeter.

28. The friction member of claim 25, wherein the binder is prepared from a binder precursor that is radiation curable.

29. The friction member of claim 25, wherein the friction particles are particles selected from the group consisting of coke, carbon black, graphite and combinations thereof.

30. The friction member of claim 25, wherein the layer of material further comprises a continuous land layer extending beneath and between the friction composites.

31. A friction member comprising:

a layer of material fixed to a backing, the layer of material comprising a friction surface having at least 120 composites per square centimeter, each having a cross-sectional or three dimensional shape selected from the group consisting of parallelepipeds, rectangles, cones, truncated pyramids, semicircles, circles, triangles, squares, hexagons, pyramids, octagons, and combinations thereof, where each composite comprises friction particles dispersed in a binder, wherein the friction member is operatively adapted to form a portion of an automobile torque transmitting device.

32. A friction member comprising:

a layer of material fixed to a backing, the layer of material comprising a friction surface having a non-random pattern of at least 120 composites per square centimeter, each comprising at least one flat surface, where each composite comprises friction particles dispersed in a binder, and wherein the friction member is operatively adapted to form a portion of an apparatus selected from the group consisting of clutches, brakes, transmissions, synchronizer rings, and train tracks.

33. A friction member comprising:

a layer of material fixed to a backing comprising a fibrous material, the layer of material comprising a friction surface having a plurality of precisely shaped friction composites, each of the precisely shaped friction composites having a cross-sectional or three dimensional shape selected from the group consisting of parallelepipeds, rectangles, cones, truncated pyramids, semicircles, circles, triangles, squares, hexagons, pyramids, octagons, and combinations thereof, wherein each of the precisely shaped friction composites further has precisely the same shape as that of a cavity on a forming tool, where each precisely shaped friction composite comprises friction particles dispersed in a binder, wherein the friction member is operatively adapted to transmit torque between two elements, where the two elements are (i) two rotatable elements or (ii) a non-rotatable element and a rotatable element, and the friction member is operatively adapted to form a part of one of the elements that contacts and transmits torque therebetween, wherein the two elements form part of an apparatus selected from the group consisting of clutches, brakes, transmissions, synchronizer rings, and train tracks.

34. The friction member of claim 33, wherein the fibrous material comprises aramid polymer staple fibers bonded with an acrylic latex.

35. A friction member comprising:

a layer of material fixed to a backing, the layer of material comprising a friction surface having a plurality of precisely shaped friction composites, each of the precisely shaped friction composites having a cross-sectional or three dimensional shape selected from the group consisting of parallelepipeds, rectangles, cones, truncated pyramids, semicircles, circles, triangles, squares, hexagons, pyramids, octagons, and combinations thereof, wherein each of the precisely shaped friction composites further has precisely the same shape as that of a cavity on a forming tool, where each precisely shaped friction composite comprises friction particles dispersed in a binder, wherein the friction member is operatively adapted to form a portion of an apparatus for transmitting torque between two elements of a vehicle, where the apparatus is a component of the vehicle, the two elements are (i) two rotatable elements or (ii) a non-rotatable element and a rotatable element, and the friction member is operatively adapted to form a part of one of the elements that contacts and transmits torque therebetween, wherein the apparatus is selected from the group consisting of clutches, transmissions, and synchronizer rings.

* * * * *

UNITED STATES PATENT AND TRADEMARK OFFICE
CERTIFICATE OF CORRECTION

PATENT NO.    : 6,524,681 B1
DATED         : February 25, 2003
INVENTOR(S)   : Seitz, David S.

It is certified that error appears in the above-identified patent and that said Letters Patent is hereby corrected as shown below:

Column 3,
Line 64, please replace "having a from" with -- having a front --.

Column 4,
Line 18, please replace "one resin have" with -- one resin having --.
Line 53, please replace "transmitting application:" with -- transmitting applications: --.
Line 66, please replace "ad" with -- and --.

Column 8,
Line 16, after "to about 1150" please add -- composites per square centimeter is suitable; although higher or lower values may --.

Column 9,
Line 63, after the word "initiator" and before the word "In" please insert -- . --.

Column 11,
Line 19, please replace "farther" with -- further --.

Column 12,
Line 14, please delete "." after "5,500,273".

Column 13,
Line 55, kindly replace "more of these Woven" with -- more of these. Woven --.

Column 18,
Line 45, please add -- . -- after "550 nanometers".

Column 25,
Line 9, please replace "oh" with -- on --.

UNITED STATES PATENT AND TRADEMARK OFFICE
CERTIFICATE OF CORRECTION

PATENT NO.    : 6,524,681 B1
DATED         : February 25, 2003
INVENTOR(S)   : Seitz, David S.

It is certified that error appears in the above-identified patent and that said Letters Patent is hereby corrected as shown below:

<u>Column 30,</u>
Line 41, please replace "with the "An"" with -- with the "A$\eta$" --.
Table 3a, on the line immediately following the row "A11" insert as a title -- Table 3b --.

<u>Column 31,</u>
Line 1, kindly replace "TABLE 3a-continued" with -- TABLE 3b-continued --.
Line 22, kindly replace "dyness/cm$^2$" with -- dynes/cm$^2$ --.

Signed and Sealed this

Fourth Day of November, 2003

JAMES E. ROGAN
*Director of the United States Patent and Trademark Office*